US012772102B2

(12) United States Patent
Li et al.

(10) Patent No.: US 12,772,102 B2
(45) Date of Patent: Oct. 20, 2026

(54) METHOD FOR BUFFER STATUS REPORT, METHOD FOR CONFIGURING BUFFER STATUS REPORT AND APPARATUSES THEREOF

(71) Applicant: 1FINITY, INC., Kawasaki (JP)

(72) Inventors: Guorong Li, Beijing (CN); Lei Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 204 days.

(21) Appl. No.: 18/220,348

(22) Filed: Jul. 11, 2023

(65) Prior Publication Data

US 2023/0354092 A1 Nov. 2, 2023

Related U.S. Application Data

(63) Continuation of application No. PCT/CN2021/071427, filed on Jan. 13, 2021.

(51) Int. Cl.
*H04W 28/02* (2009.01)

(52) U.S. Cl.
CPC ................................ *H04W 28/0278* (2013.01)

(58) Field of Classification Search
CPC ................................................ H04W 28/0278
See application file for complete search history.

(56) References Cited

U.S. PATENT DOCUMENTS

2019/0335357 A1 10/2019 Shi et al.
2020/0205029 A1 6/2020 Lee et al.
2020/0236583 A1 7/2020 Tang
2020/0275308 A1 8/2020 Liu et al.
2021/0022205 A1* 1/2021 Sun ........................ H04W 28/06
2022/0095415 A1* 3/2022 Liu ........................ H04W 80/02
2022/0256576 A1* 8/2022 Wu ......................... H04L 1/188
2023/0027256 A1* 1/2023 Chen ................. H04W 28/0278
2023/0217304 A1* 7/2023 Singh ................ H04W 72/1263
370/329

(Continued)

FOREIGN PATENT DOCUMENTS

CN 102457895 A 5/2012
CN 107360591 A 11/2017

(Continued)

OTHER PUBLICATIONS

Hearing Notice issued by the Patent Office of India for corresponding Indian Patent Application No. 202337042592, mailed on Mar. 7, 2025, with an English translation.

(Continued)

*Primary Examiner* — Kevin T Bates
*Assistant Examiner* — Jaeyoung Kwak
(74) *Attorney, Agent, or Firm* — Myers Wolin, LLC

(57) ABSTRACT

A method for buffer status report, a method for configuring buffer status report and apparatuses thereof. The method is applicable to an IAB-node and includes: generating a buffer status report MAC CE (BSR MAC CE), the buffer status report MAC CE containing information on all logical channel groups having data to be transmitted and information on at least one buffer size, a maximum possible number of the logical channel groups being greater than 8; and transmitting the buffer status report MAC CE.

8 Claims, 17 Drawing Sheets

(56) References Cited

U.S. PATENT DOCUMENTS

| | | | | |
|---|---|---|---|---|
| 2023/0247478 | A1* | 8/2023 | Wang | H04W 28/0278 370/235 |
| 2023/0276476 | A1* | 8/2023 | Zhang | H04W 72/04 370/329 |
| 2024/0121787 | A1* | 4/2024 | Lee | H04W 72/1263 |

FOREIGN PATENT DOCUMENTS

| | | | | |
|---|---|---|---|---|
| CN | 110800328 | A | 2/2020 | |
| CN | 111149312 | A | 5/2020 | |
| CN | 111757517 | A | 10/2020 | |
| IN | 110622605 | A | 12/2019 | |
| KR | 10-2020-0080285 | A | 7/2020 | |
| WO | 2016/159528 | A1 | 10/2016 | |
| WO | WO-2018169277 | A1 * | 9/2018 | H04W 28/0278 |
| WO | 2019/084730 | A1 | 5/2019 | |
| WO | 2020/116820 | A1 | 6/2020 | |
| WO | WO-2020114058 | A1 * | 6/2020 | H04W 28/0278 |
| WO | WO-2020199829 | A1 * | 10/2020 | H04W 72/21 |

OTHER PUBLICATIONS

Notice of Reasons for Refusal issued by the Japan Patent Office for corresponding Japanese Patent Application No. 2023-541865, mailed on Jun. 11, 2024, with an English translation.

Samsung, "IAB MAC-miscellaneous corrections and clarifications", Work item code: NR_IAB-Core, 3GPP TSG-RAN WG2 Meeting #111-e, Change Request, R2-2007199, E-meeting, Aug. 17-28, 2020.

Nokia et al., "Handling of IAB specific MAC CEs", Agenda Item: 6.1.4, 3GPP TSG-RAN WG2 Meeting #109bis-e, R2-2003049, Elbonia, Apr. 20-30, 2020.

VIVO, "Discussion on LCG extension issues", Agenda Item: 8.4.2, 3GPP TSG RAN WG2 #116-electronic, R2-2110290, Online, Nov. 1-12, 2021, cited in KROA.

Notice of Preliminary Rejection issued by the Korean Intellectual Property Office for corresponding Korean Patent Application No. 10-2023-7023576, mailed on Jul. 30, 2025, with an English translation.

International Search Report and Written Opinion of the International Searching Authority issued by the China National Intellectual Property Administration for corresponding International Patent Application No. PCT/CN2021/071427, mailed on Sep. 28, 2021, with an English translation.

Ericsson et al., "Logical Channel Grouping for BSR in IAB Networks", Agenda Item: 11.1.2, 3GPP TSG-RAN WG2 Meeting #103b, R2-1814363, Chengdu, P. R. China, Oct. 8-12, 2018.

Ericsson, "LCID and LCG Extension in IAB Networks", Agenda Item: 6.1.4.2, 3GPP TSG-RAN WG2 Meeting #107bis, R2-1913182 (update of R2-1910491), Chongqing, P. R. of China, Oct. 14-18, 2019.

3GPP TS 38.321 V16.2.1, "3rd Generation Partnership Project; Technical Specification Group Radio Access Network; NR; Medium Access Control (MAC) protocol specification (Release 16)", Sep. 2020.

Notice of Reasons for Refusal issued by the Japan Patent Office for corresponding Japanese Patent Application No. 2023-541865, mailed on Nov. 26, 2024, with an English translation.

The Extended European search report with the Supplementary European search report and the European search opinion, issued by the European Patent Office for corresponding European Patent Application No. 21918237.5, mailed on Dec. 21, 2023.

LG Electronics Inc, "Consideration on LCG space extension", Agenda Item: 11.1.4 (NR_IAB-Core), 3GPP TSG-RAN WG2 Meeting #105-Bis, R2-1905062 (revision of R2-1902021), Xi'an, China, Apr. 8-12, 2019.

Ericsson, "LCG Extension", Agenda Item: 11.1.4, 3GPP TSG-RAN WG2 #107, R2-1910492 (update of R2-1906995), Prague, Czech Republic, Aug. 26-30, 2019.

Examination Report issued by the Indian Patent Office for corresponding Indian Patent Application No. 202337042592, mailed on Aug. 28, 2024, with an English translation.

First Notification of Office Action and Search Report issued by the China National Intellectual Property Administration for corresponding Chinese Patent Application No. 202180090007.5, mailed on Jun. 5, 2026, with an English translation.

* cited by examiner

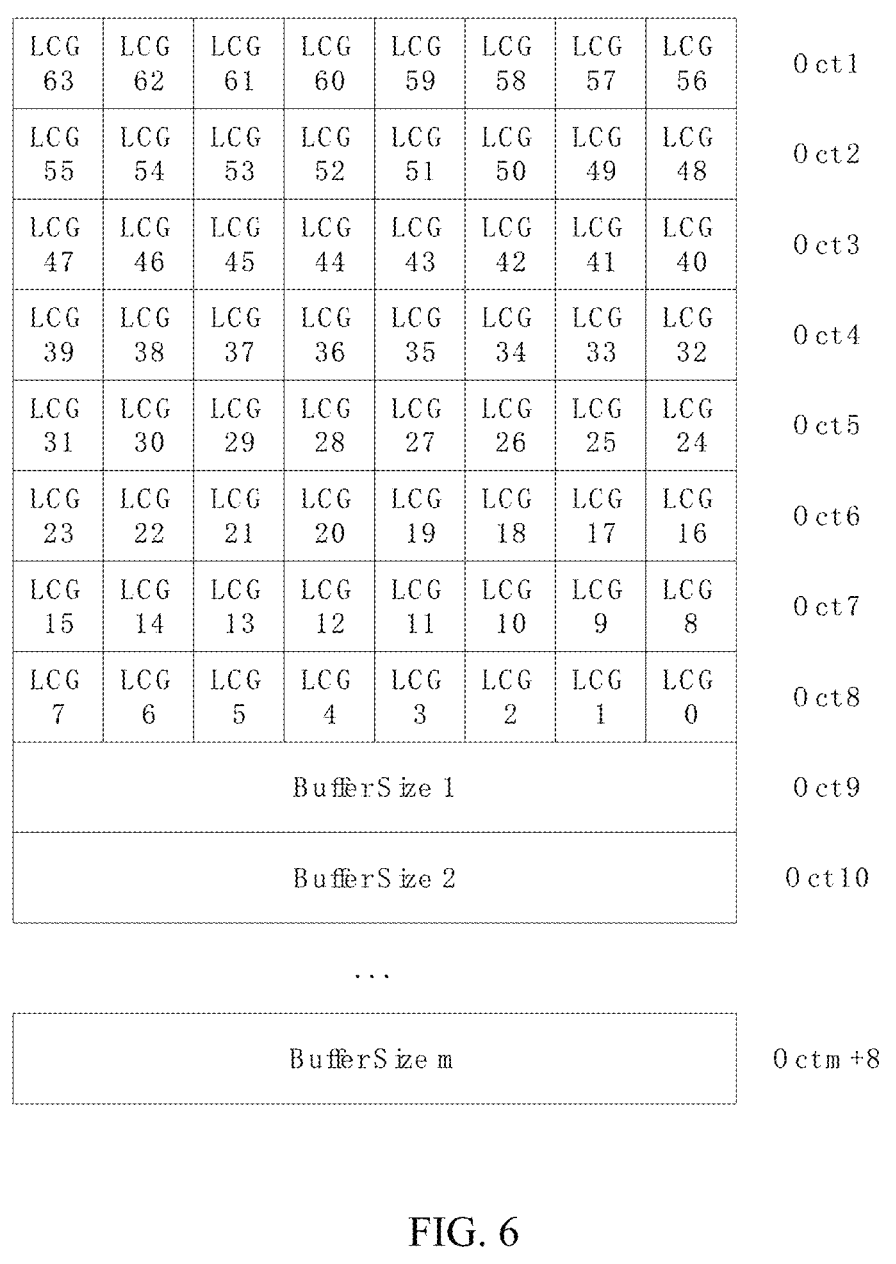

| | | | | | | | | |
|---|---|---|---|---|---|---|---|---|
| LCG 63 | LCG 62 | LCG 61 | LCG 60 | LCG 59 | LCG 58 | LCG 57 | LCG 56 | Oct1 |
| LCG 55 | LCG 54 | LCG 53 | LCG 52 | LCG 51 | LCG 50 | LCG 49 | LCG 48 | Oct2 |
| LCG 47 | LCG 46 | LCG 45 | LCG 44 | LCG 43 | LCG 42 | LCG 41 | LCG 40 | Oct3 |
| LCG 39 | LCG 38 | LCG 37 | LCG 36 | LCG 35 | LCG 34 | LCG 33 | LCG 32 | Oct4 |
| LCG 31 | LCG 30 | LCG 29 | LCG 28 | LCG 27 | LCG 26 | LCG 25 | LCG 24 | Oct5 |
| LCG 23 | LCG 22 | LCG 21 | LCG 20 | LCG 19 | LCG 18 | LCG 17 | LCG 16 | Oct6 |
| LCG 15 | LCG 14 | LCG 13 | LCG 12 | LCG 11 | LCG 10 | LCG 9 | LCG 8 | Oct7 |
| LCG 7 | LCG 6 | LCG 5 | LCG 4 | LCG 3 | LCG 2 | LCG 1 | LCG 0 | Oct8 |
| BufferSize 1 | | | | | | | | Oct9 |
| BufferSize 2 | | | | | | | | Oct10 |
| ... | | | | | | | | |
| BufferSize m | | | | | | | | Octm+8 |

FIG. 6

| | | | | | | | |
|---|---|---|---|---|---|---|---|
| LCG 31 | LCG 30 | LCG 29 | LCG 28 | LCG 27 | LCG 26 | LCG 25 | LCG 24 |
| LCG 23 | LCG 22 | LCG 21 | LCG 20 | LCG 19 | LCG 18 | LCG 17 | LCG 16 |
| LCG 15 | LCG 14 | LCG 13 | LCG 12 | LCG 11 | LCG 10 | LCG 9 | LCG 8 |
| LCG 7 | LCG 6 | LCG 5 | LCG 4 | LCG 3 | LCG 2 | LCG 1 | LCG 0 |
| BufferSize 1 | | | | | | | |
| BufferSize 2 | | | | | | | |
| ... | | | | | | | |
| BufferSize m | | | | | | | |

| | | | | | | | |
|---|---|---|---|---|---|---|---|
| LCG 63 | LCG 62 | LCG 61 | LCG 60 | LCG 59 | LCG 58 | LCG 57 | LCG 56 |
| LCG 55 | LCG 54 | LCG 53 | LCG 52 | LCG 51 | LCG 50 | LCG 49 | LCG 48 |
| LCG 47 | LCG 46 | LCG 45 | LCG 44 | LCG 43 | LCG 42 | LCG 41 | LCG 40 |
| LCG 39 | LCG 38 | LCG 37 | LCG 36 | LCG 35 | LCG 34 | LCG 33 | LCG 32 |
| BufferSize 1 | | | | | | | |
| BufferSize 2 | | | | | | | |
| ... | | | | | | | |
| BufferSize m | | | | | | | |

METHOD FOR BUFFER STATUS REPORT, METHOD FOR CONFIGURING BUFFER STATUS REPORT AND APPARATUSES THEREOF

CROSS-REFERENCE TO RELATED APPLICATION

This application is a continuation application of International Application PCT/CN2021/071427 filed on Jan. 13, 2021, and designated the U.S., the entire contents of which are incorporated herein by reference.

TECHNICAL FIELD

This disclosure relates to the field of communication technologies.

BACKGROUND

Integrated access and backhaul (IAB) technology enables 5G RAN to support wireless relay. An integrated access and backhaul node (IAB-node) supports access and backhaul via New Radio (NR). A termination point of NR backhaul at a network side is referred to as an IAB-donor, which represents a network device (such as a gNB) having a functionality of supporting IAB. Backhaul may occur via single or multiple hops.

FIG. 1 is a schematic diagram of an overall architecture of IAB. As shown in FIG. 1, the overall architecture of IAB is in a duplex (SA) mode. FIG. 2 is another schematic diagram of the overall architecture of IAB. As shown in FIG. 2, the overall architecture of the IAB in a dual-connectivity (EN-DC) mode. In the dual-connectivity mode, the IAB-node is connected to an MeNB via E-UTRA, and the IAB-donor terminates X2-C as an SgNB.

The IAB-node supports a function of a gNB-DU (distributed unit), referred to as an IAB-DU. The IAB-DU is an endpoint of New Radio access (NR access) interface to a terminal equipment (UE) and a next hop of IAB-node, and is also an endpoint of an F1 protocol to a gNB-CU (central unit) on the IAB-node.

In addition to the gNB DU function, the IAB-node also supports functions of some UEs, referred to as an IAB-MT. The IAB-MT includes functions of, for example, a physical layer, layer 2, RRC and an NAS, so as to be connected to a gNB-DU of another IAB-node or IAB-donor, connected to a gNB CU on the IAB-donor, and connected to a core network.

The IAB-node supports a function of a gNB DU (distributed unit), i.e. an IAB-DU. The IAB-DU terminates an NR access interface to the terminal equipment and a next hop of IAB-node, and terminates an F1 protocol to the gNB-CU function on the IAB-donor. In addition, the IAB-node supports a subset of terminal equipment functions (UE functions), namely, IAB-MT, which includes, for example, functions of a gNB-DU connected to another IAB-node or the IAB-donor, a gNB-CU (centralized unit) connected to the IAB-donor and a physical layer, layer 2 (L2), RRC (radio resource control) and NAS (non-access stratum) connected to a core network.

The IAB-node is connected to an IAB-donor via one or more hops. In topology, the IAB-donor is a root node, a neighboring node on the IAB-DU interface of the IAB-node is referred to as a descendant IAB-node, i.e. a descendant IAB-node, and a neighboring node on an IAB-MT interface is referred to as a parent node, i.e. a parent IAB-node.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In Release 15 and Release 16 (including Release 16 IAB) of NR, a buffer status report (BSR) procedure is described in subsection 5.4.5 of TS 38.321. The BSR procedure is used to provide information on uplink data volume in an MAC entity to a serving gNB. Each logical channel may be assigned to a logical channel group (LCG), and a maximum number of LCGs is 8 in Release 15 and Release 16.

Under specific conditions, the MAC entity of the UE may trigger regular BSR, or padding BSR, or periodic BSR.

For different types of BSRs, different BSRs are reported under different conditions, such as a long BSR (Long BSR), a short BSR (Short BSR), a short truncated BSR (Short Truncated BSR), and a long truncated BSR (Long Truncated BSR).

For example, for report of the BSRs, it is stipulated in subsection 5.4.5 of TS 38.321 that:

For Regular and Periodic BSR, the MAC entity shall:
1>if more than one LCG has data available for transmission when the MAC PDU containing the BSR is to be built:
2>report Long BSR for all LCGs which have data available for transmission.
1>else:
2>report Short BSR.
For Padding BSR, the MAC entity shall:
1>if the number of padding bits is equal to or larger than the size of the Short BSR plus its subheader but smaller than the size of the Long BSR plus its subheader:
2>if more than one LCG has data available for transmission when the BSR is to be built:
3>if the number of padding bits is equal to the size of the Short BSR plus its subheader:
4>report Short Truncated BSR of the LCG with the highest priority logical channel with data available for transmission.
3>else:
4>report Long Truncated BSR of the LCG(s) with the logical channels having data available for transmission following a decreasing order of the highest priority logical channel (with or without data available for transmission) in each of these LCG(s), and in case of equal priority, in increasing order of LCGID.
2>else:
3>report Short BSR.

-continued

```
1>else if the number of padding bits is equal to or larger than the size of the Long
  BSR plus its subheader:
  2>report Long BSR for all LCGs which have data available for transmission.
```

In addition, the BSRs are generally reported via buffer status report MAC CEs. For example, subsection 6.1.3.1 of TS 38.321 further specifies formats of the buffer status report MAC CEs.

FIG. 3 is a schematic diagram of formats of an existing short BSR MAC CE and truncated BSR MAC CE, and FIG. 4 is a schematic diagram of formats of an existing long BSR MAC CE, long truncated BSR MAC CE and pre-emptive BSR MAC CE.

As shown in FIG. 3, lengths of the short BSR MAC CE and short truncated BSR MAC CE are 1 byte, consisting of an LCG ID field and buffer size (Buffer Size) field. The LCG ID field is used to identify a logical channel group that is being reported by the buffer status report, and a length of the LCG ID field is 3 bits. The buffer size field represents a total data volume to be transmitted across all logical channels of the logical channel group. The data volume is indicated in number of bytes, and a length of the buffer size field is 5 bits.

As shown in FIG. 4, a maximum number of logical channel groups reported by the buffer status report is 8, 8 LCGi fields forming 1 byte, a length of the LCGi fields being 1 bit, and i being 0-7.

For a long BSR format and a pre-emptive BSR format, the LCGi field indicates whether a buffer size field is present for a logical channel group i. Setting the LCGi field to be 1 indicates that a buffer size field for the logical channel group i is reported; and setting the LCGi field to be 0 indicates that the buffer size field for the logical channel group i is not reported.

For a long truncated BSR format, the LCGi field indicates whether the logical channel group i has data to be transmitted (data available). Setting the LCGi field to be 1 indicates that the logical channel group i has data to be transmitted; and setting the LCGi field to be 0 indicates that the logical channel group i has no data to be transmitted.

The buffer size field is used to identify a total data volume to be transmitted across all logical channels of a logical channel group after an MAC PDU has been built, the data volume being indicated by the number of bytes. For the short BSR format and truncated BSR format, a length of the buffer size field is 5 bits. For the long BSR format and the long truncated BSR format, the length of the buffer size field is 8 bits.

It was found by the inventors that in R17 IAB, in order to reduce latency, it is possible to increase the number of LCGs for an IAB-MT, that is, greater than 8 LCGs, so that logical channels having different requirements on latency may correspond to different logical channel groups. However, the determination of BSR report formats and MAC CE formats in existing techniques only support 8 LCGs at most and are unable to support a larger maximum number of LCGs. Therefore, there is no reporting mechanism of BSRs for a maximum number of LCGs greater than 8 in existing techniques.

In order to solve one or more of the above problems, embodiments of this disclosure provide a method for buffer status report, a method for configuring buffer status report and apparatuses thereof.

According to a first aspect of the embodiments of this disclosure, there is provided an apparatus for buffer status report, applicable to an IAB-node, the apparatus including: a first generating unit configured to generate a buffer status report (BSR) MAC CE, the buffer status report MAC CE containing information on all logical channel groups having data to be transmitted and information on at least one buffer size, a maximum possible number of the logical channel groups being greater than 8; and a first transmitting unit configured to transmit the buffer status report MAC CE.

According to a second aspect of the embodiments of this disclosure, there is provided an apparatus for buffer status report, applicable to an IAB-node, the apparatus including: a second generating unit configured to generate a short buffer status report MAC CE when the number of logical channel group having data to be transmitted is not more than one, the buffer status report MAC CE containing information on a logical channel group and information on a buffer size, and a length of the short buffer status report MAC CE being 2 bytes; and a second transmitting unit configured to transmit the short buffer status report MAC CE.

According to a third aspect of the embodiments of this disclosure, there is provided an apparatus for buffer status report, applicable to an IAB-node, the apparatus including: a third generating unit configured to generate a short buffer status report (BSR) MAC CE when the number of logical channel groups having data to be transmitted is not more than N, the short buffer status report MAC CE containing information on N logical channel groups and information on at least one buffer size, N being an integer greater than or equal to 2; and a third transmitting unit configured to transmit the short buffer status report MAC CE.

According to a fourth aspect of the embodiments of this disclosure, there is provided an apparatus for configuring buffer status report, applicable to an IAB-donor, the apparatus including: a transmitting unit configured to transmit configuration information used for buffer status report to an IAB-node, the configuration information including at least one of the following: a configured logical channel group identity, the number of configured logical channels (LCHs), a configured BH LCH ID, configuring whether an extended LCG range is adopted, and configuring whether a new buffer status report MAC CE format is adopted.

According to a fifth aspect of the embodiments of this disclosure, there is provided a network device, including the apparatus as described in any of the first to fourth aspects.

According to a sixth aspect of the embodiments of this disclosure, there is provided a communication system, including a first network device, a second network device and a terminal equipment, the first network device including the apparatus as described in any of the first to third aspects, and the second network device including the apparatus as described in the fourth aspect.

According to a seventh aspect of the embodiments of this disclosure, there is provided a method for buffer status report, applicable to an IAB-node, the method including: generating a buffer status report (BSR) MAC CE, the buffer status report MAC CE containing information on all logical channel groups having data to be transmitted and information on at least one buffer size, a maximum possible number of the logical channel groups being greater than 8; and transmitting the buffer status report MAC CE.

According to an eighth aspect of the embodiments of this disclosure, there is provided a method for buffer status report, applicable to an IAB-node, the method including: generating a short buffer status report MAC CE when the number of logical channel group having data to be transmitted is not more than one, the buffer status report MAC CE containing information on a logical channel group and information on a buffer size, and a length of the short buffer status report MAC CE being 2 bytes; and transmitting the short buffer status report MAC CE.

According to a ninth aspect of the embodiments of this disclosure, there is provided a method for buffer status report, applicable to an IAB-node, the method including: generating a short buffer status report (BSR) MAC CE when the number of logical channel groups having data to be transmitted is not more than N, the short buffer status report MAC CE containing information on N logical channel groups and information on at least one buffer size, N being an integer greater than or equal to 2; and transmitting the short buffer status report MAC CE.

According to a tenth aspect of the embodiments of this disclosure, there is provided a method for configuring buffer status report, applicable to an IAB-donor, the method including: transmitting configuration information used for buffer status report to an IAB-node, the configuration information including at least one of the following: a configured logical channel group identity, the number of configured logical channels (LCHs), a configured BH LCH ID, configuring whether an extended LCG range is adopted, and configuring whether a new buffer status report MAC CE format is adopted.

According to an eleventh aspect of the embodiments of this disclosure, there is provided a computer readable program code, which, when executed in an apparatus for buffer status report or a network device, will cause the apparatus for buffer status report or the network device to carry out the method for buffer status report as described in the seventh or the eighth or the ninth or the tenth aspect of the embodiments of this disclosure.

According to a twelfth aspect of the embodiments of this disclosure, there is provided a computer readable medium, including a computer readable program code, which will cause an apparatus for buffer status report or a network device to carry out the method for buffer status report as described in the seventh or the eighth or the ninth or the tenth aspect of the embodiments of this disclosure.

An advantage of the embodiments of this disclosure exists in that the BSR MAC CE containing information on all logical channel groups with a maximum possible number greater than 8 having data to be transmitted and at least one piece of buffer size information is generated and transmitted without performing determination of a long BSR report or a short BSR report, or, when the number of logical channel groups having data to be transmitted is not greater than 1, a short BSR MAC CE of a length of 2 bytes containing information on a logical channel group and one piece of buffer size information is generated and transmitted, or, when the number of logical channel groups having data to be transmitted is not greater than N, a short BSR MAC CE containing information on N logical channel groups and at least one piece of buffer size information is generated and transmitted, N being an integer greater than or equal to 2. In this way, an effective BSR report mechanism may be provided for a case where the maximum number of logical channel groups is greater than 8.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 6 is a schematic diagram of a buffer status report MAC CE of Embodiment 1 of this disclosure;

DETAILED DESCRIPTION

Figure 1:
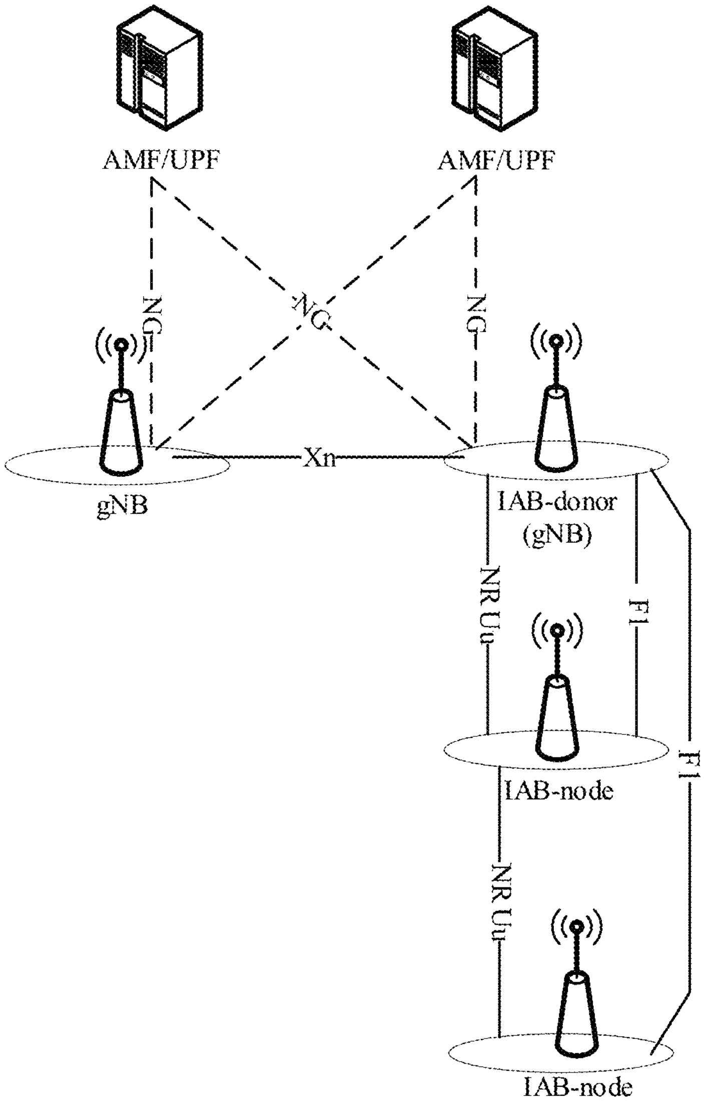
FIG. 1 is a schematic diagram of an overall architecture of IAB.
Figure 2:
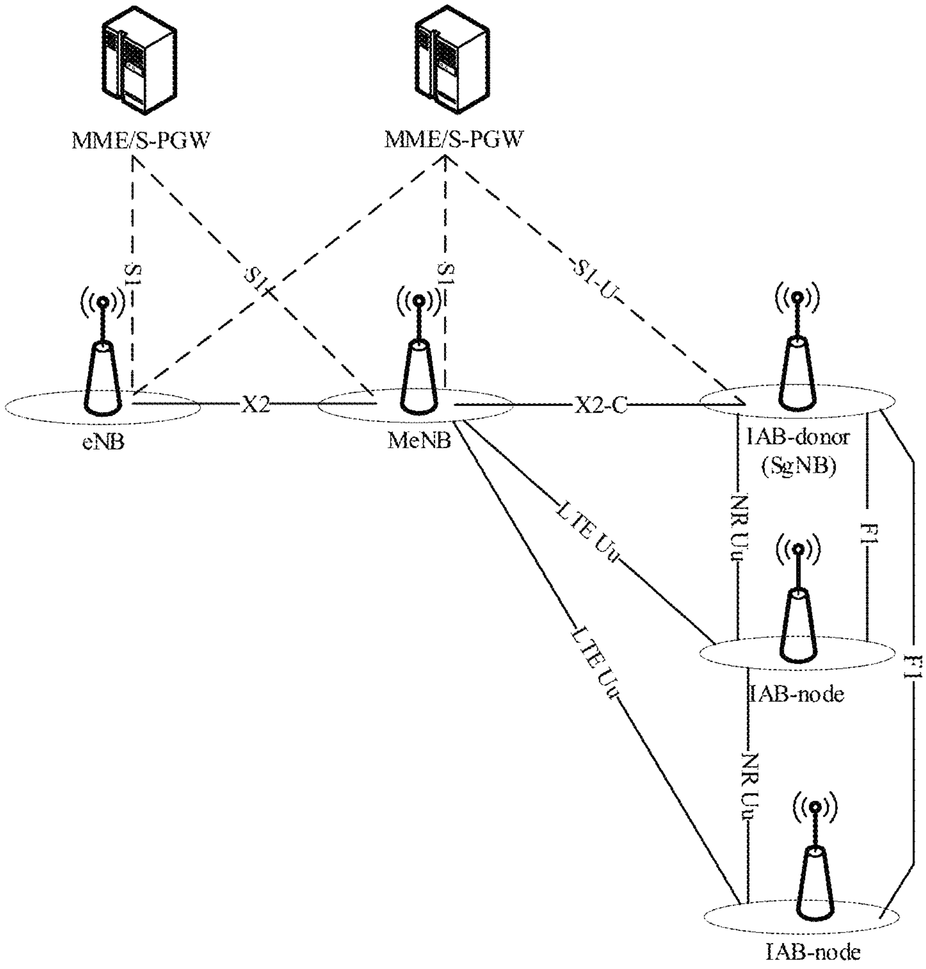
FIG. 2 is another schematic diagram of the overall architecture of the IAB.
Figure 3:
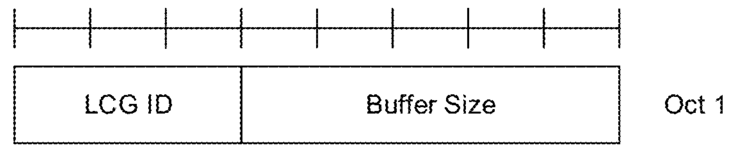
FIG. 3 is a schematic diagram of formats of an existing short BSR MAC CE and truncated BSR MAC CE.
Figure 4:
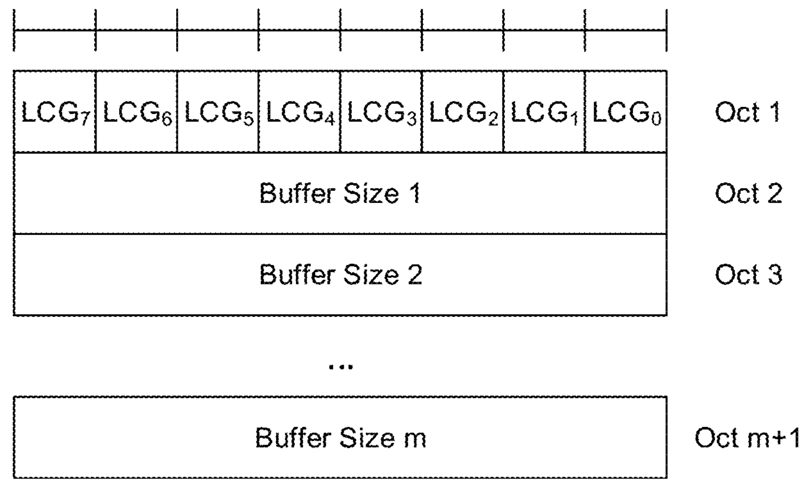
FIG. 4 is a schematic diagram of formats of an existing long BSR MAC CE, long truncated BSR MAC CE and pre-emptive BSR MAC CE.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and New Radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a node and/or donor in an IAB architecture, a base station (BS), an access point (AP), a transmission reception point (TRP), a broadcast transmitter, a mobile management entity (MME), a gateway, a server, a radio network controller (RNC), a base station controller (BSC), etc.

In the embodiments of this disclosure, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)", such as a terminal equipment in an IAB architecture served by an IAB-node or an IAB-donor.

The terminal equipment may be fixed or mobile, and may also be referred to as a mobile station (MS), a terminal, a subscriber station (SS), an access terminal (AT), and a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, all of "when . . . ", "in a case where . . . ", "for a case where . . . " and "if . . . " denote one or some conditions or states, and furthermore, all of these expressions are interchangeable.

Various implementations of the embodiments of this disclosure shall be described below with reference to the accompanying drawings. Theses implementations are illustrative only, and are not intended to limit this disclosure.

Embodiment 1

The embodiment of this disclosure provides a method for buffer status report, applicable to an IAB-node.

Figure 5:
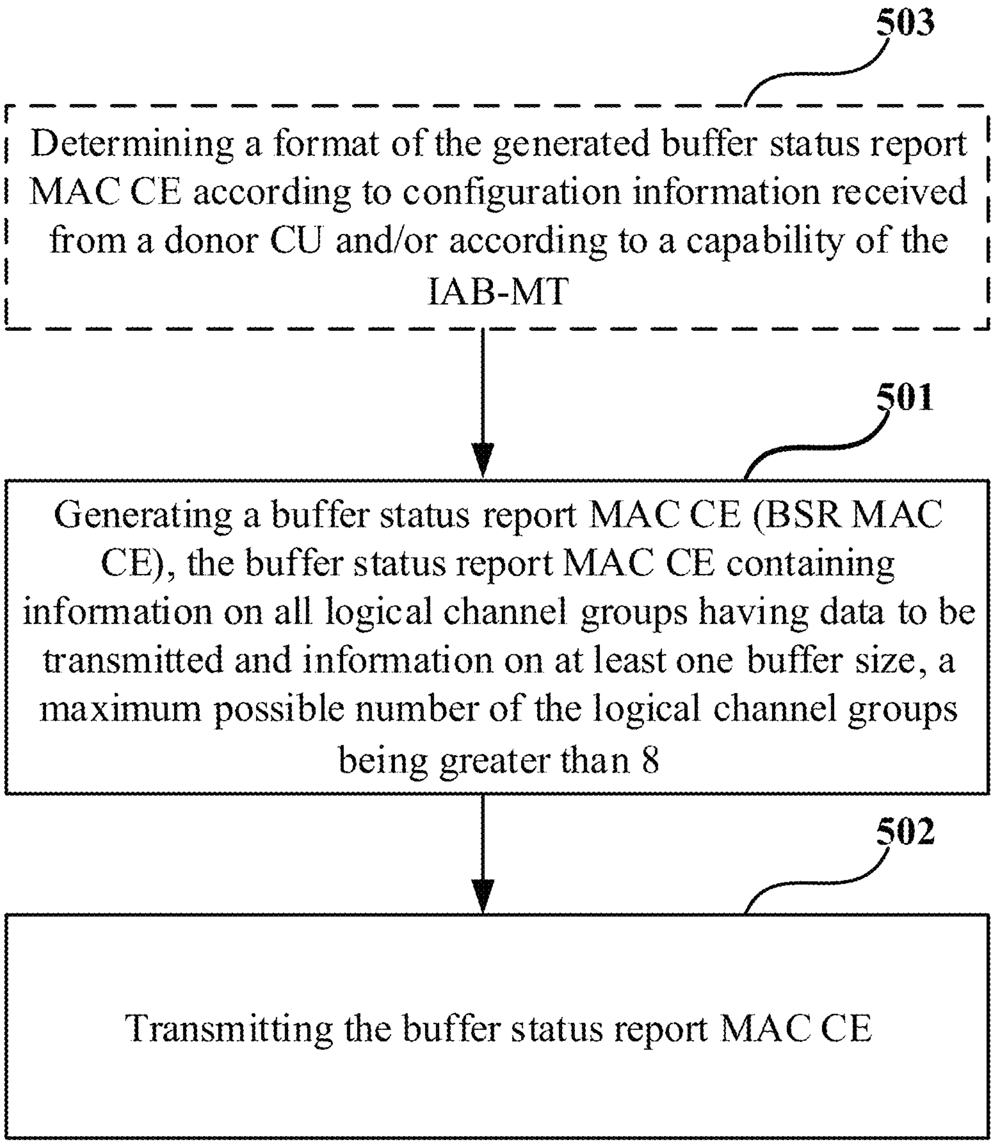
FIG. 5 is a schematic diagram of the method for buffer status report of Embodiment 1 of this disclosure.

FIG. 5 is a schematic diagram of the method for buffer status report of Embodiment 1 of this disclosure. As shown in FIG. 5, the method includes:

step 501: generating a buffer status report (BSR) MAC CE, the buffer status report MAC CE containing information on all logical channel groups having data to be transmitted and information on at least one buffer size, a maximum possible number of the logical channel groups being greater than 8; and step 502: transmitting the buffer status report MAC CE.

Thus, an effective BSR reporting mechanism may be provided for a case where a maximum number of logical channel groups exceeds 8. Moreover, as determination of a long or short BSR report by the IAB-MT in existing standards is eliminated, operations of the IAB-MT are simplified, and implementations of products are simpler. In addition, as the number of newly introduced MAC CEs is relatively small, occupation of related identities may be reduced, and complexity of system design may be lowered.

In the embodiment of this disclosure, as the IAB-node needs to serve multiple UEs and/or serve IAB descendant nodes, it was agreed by 3GPP in R16 that a maximum number of logical channels (LCHs) supported by an IAB-MT is 2^16=65536 (excluding MAC CEs), which is much higher than a conventional UE (supporting 32 logical channels and 8 LCGs). Assuming that the number of logical channel priorities that may be configured for the IAB-MT in R17 is still 16 (values 1-16), it is supposed that the number of hops of an IAB network is usually less than or equal to 4, the number of LCGs supported in R17 may be 16*4=64. However, this disclosure is not limited thereto, and the number of the LCGs may also be 16, 32, 128, and 256, etc., such as an integer power of 2. The embodiment of this disclosure is described by taking 64 LCGs as an example.

In the embodiment of this disclosure, the buffer status report MAC CE generated and transmitted in the method of the embodiment of this disclosure may also be referred to as a new buffer status report MAC CE (New BSR MAC CE), or an IAB buffer status report MAC CE (IAB BSR MAC CE), or an extended buffer status report MAC CE (Extended BSR MAC CE), etc.

In step 502, for example, for a regular BSR and periodic BSR, a buffer status report MAC CE containing information on all logical channel groups having data to be transmitted and information on buffer sizes to which the logical channel groups correspond is generated, and the buffer status report MAC CE may further contain information on all logical channel groups configured for the IAB-MT or information on all logical channel groups supported by the IAB-MT;

for a padding BSR, when the number of padding bits is greater than or equal to a size of the buffer status report MAC CE plus a size of its subheader, the buffer status report MAC CE contains information on all logical channel groups having data to be transmitted and information on buffer sizes to which the logical channel groups correspond, and may also include information on all logical channel groups configured for the IAB-MT or information on all logical channel groups supported by the IAB-MT; when the number of padding bits is less than the size of the buffer status report MAC CE plus the size of its subheader, the generated buffer status report is a truncated buffer status report (Truncated BSR), the truncated buffer status report MAC CE contains information on logical channel groups having data to be transmitted of a number not exceeding the number of the padding bits and information on a buffer size to which at least one logical channel group corresponds, and may also include information on all logical channel groups configured for the IAB-MT or information on all logical channel groups supported by the IAB-MT; and when the number of padding bits is less than the size of the information on the logical channel groups in the buffer status report MAC CE plus the size of the subheader of the buffer status report MAC CE, a buffer status report MAC CE or a truncated buffer status report MAC CE is not generated.

In step 502, the generated buffer status report MAC CE is transmitted to the parent node or IAB-donor of the IAB-node.

Description in corresponding standards is, for example:

For Regular and Periodic BSR, the MAC entity shall:
  1>report BSR for all LCGs which have data available for transmission.
For Padding BSR, the MAC entity shall:
  1>if the number of padding bits is smaller than the size of the BSR plus its subheader:
    2>report Truncated BSR of the LCG(s) with the logical channels having data available for transmission following a decreasing order of the highest priority logical channel (with or without data available for transmission) in each of these LCG(s), and in case of equal priority, in increasing order of LCGID.
  1>else if the number of padding bits is equal to or larger than the size of the BSR plus its subheader:
    2>report BSR for all LCGs which have data available for transmission.

In the embodiment of this disclosure, the buffer status report MAC CE may include a first buffer status report MAC CE, the first buffer status report MAC CE indicating whether information on a buffer size to which a logical channel group corresponds is reported or whether a logical channel group has data to be transmitted via a bitmap.

For example, a length of the bitmap is 2 bytes or 4 bytes or 8 bytes or 16 bytes or 32 bytes.

In the embodiment of this disclosure, for a case where a maximum number of logical channel groups is K, the bitmap includes K LCGi fields, the number of bytes in the bitmap may be rounded on K/8, and lengths of the LCGi fields are 1 bit; where, K is an integer greater than 8, such as 32, 64, 128, or 256, and i is an integer ranging from 0 to K−1. In addition, the LCGis may be arranged in an ascending or descending order of their indices i.

For example, for a case where the maximum number of the logical channel groups is 64, the number of bytes of the bitmap is 8.

In the embodiment of this disclosure, the buffer status report MAC CE includes the bitmap, i.e. K LCGi fields and m buffer size fields; where, m is the number of LCGi fields with a value of 1 in the K LCGi fields.

In the embodiment of this disclosure, the size of the buffer status report MAC CE is ceil (K/8)+m bytes.

In the embodiment of this disclosure, for the buffer status report MAC CE or the new buffer status report MAC CE, the LCGi field indicates presence of a buffer size field for the logical channel group i. Setting the LCGi field to be 1 indicates that a buffer size field for logical channel group i is reported, and setting the LCGi field to be 0 indicates that the buffer size field for logical channel group i is not reported;

and for the truncated buffer status reports MAC CE or the new truncated buffer status reports MAC CE, the LCGi field indicates whether logical channel group i has data to be transmitted (data available). Setting the LCGi field to be 1 indicates that logical channel group i has data to be transmitted, and setting the LCGi field to be 0 indicates that logical channel group i has no data to be transmitted.

FIG. 6 is a schematic diagram of a buffer status report MAC CE of Embodiment 1 of this disclosure. As shown in FIG. 6, an 8-byte bitmap is used to indicate whether buffer size information to which a logical channel group corresponds is reported or whether a logical channel group has data to be transmitted, and a maximum number of logical channel groups supported by it is 64, that is, the bitmap includes 64 LCGi fields from LCG0 to LCG63. In addition, the buffer status report MAC CE further includes m buffer size fields; where, m is the number of LCGi fields with a value of 1 in 64 LCGi fields, and a size of the MAC CE is m+8 bytes.

In the embodiment of this disclosure, 2 logical channel identities (LCIDs) or a 1-byte extended logical channel identity (eLCID) may be used to identify whether the first buffer status report MAC CE is a buffer status report MAC CE or a truncated buffer status report MAC CE, the buffer status report MAC CE being also referred to as a new buffer status report MAC CE (New BSR MAC CE), or an IAB buffer status report MAC CE (IAB BSR MAC CE), or an extended buffer status report MAC CE (Extended BSR MAC CE), etc, and the truncated buffer status report MAC CE being also referred to as a new truncated BSR MAC CE (New Truncated BSR MAC CE), or an IAB truncated BSR MAC CE, or an extended truncated BSR MAC CE (Extended Truncated BSR MAC CE), etc.

For example, when two LCIDs are used for identifying, values of a Codepoint and Index range from 35 to 44, such as 35 and 36, or 43 and 44, etc.

For example, when one eLCID is used for identifying, a value of a Codepoint ranges from 0 to 249, such as 248 and 249, and a value of an index ranges from 64 to 313, such as 312 and 313.

In the above example, the buffer status is reported by a first buffer status report MAC CE. In the embodiment of this disclosure, the buffer status report MAC CE further includes at least two second buffer status reports MAC CEs.

In the embodiment of this disclosure, the at least two second buffer status report MAC CEs collectively contain the information on all logical channel groups having data to be transmitted or the information on all configured logical channel groups or the information on all supported logical channel groups. That is, the at least two second buffer status report MAC CEs jointly report the buffer size information of all the logical channel groups having data to be transmitted.

In this way, when a logical channel group having data to be transmitted is within a certain range, overhead of buffer status report MAC CEs may be lowered and radio resources may be saved.

In the embodiment of this disclosure, a second buffer status report MAC CE may be identified by a logical channel identity (LCD). In addition, different second buffer status report MAC CEs may be identified by different logical channel identities.

For example, buffer status report may be performed by using two second buffer status report MAC CEs, wherein first one of the second buffer status report MAC CEs reports buffer size information to which LCG0~LCG31 correspond, and second one of the second buffer status report MAC CEs reports buffer size information to which LCG32~LCG63 correspond;

for another example, buffer status report may be performed by using four second buffer status report MAC CEs, wherein first one of the second buffer status report MAC CEs reports buffer size information to which LCG0~LCG15 correspond, second one of the second buffer status report MAC CEs reports buffer size information to which LCG16~LCG31 correspond, third one of the second buffer status report MAC CEs reports buffer size information to which LCG32~LCG47 correspond, and fourth one of the second buffer status report MAC CEs reports buffer size information to which LCG48~LCG63 correspond.

Figures 7, 8:
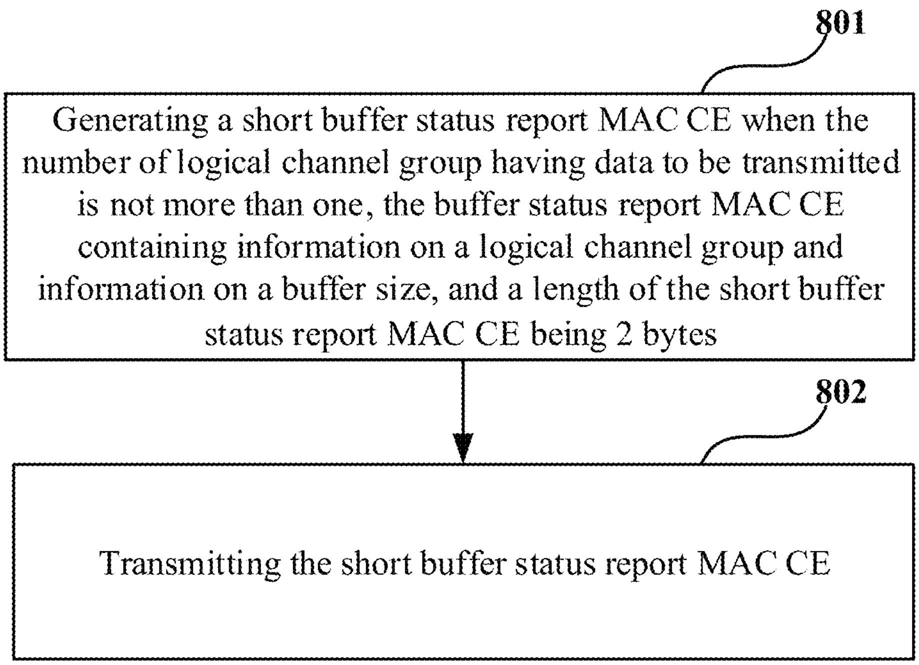
FIG. 7 is another schematic diagram of the buffer status report MAC CE of Embodiment 1 of this disclosure.
FIG. 8 is a schematic diagram of the method for buffer status report of Embodiment 2 of this disclosure.

FIG. 7 is another schematic diagram of the buffer status report MAC CE of Embodiment 1 of this disclosure. As shown in FIG. 7, buffer status report may be performed by using two second buffer status report MAC CEs, wherein first one of the second buffer status report MAC CEs reports buffer size information to which LCG0~LCG31 correspond, and second one of the second buffer status report MAC CEs reports buffer size information to which LCG32~LCG63 correspond. For example, if LCG0, LCG8 and LCG10 of the IAB-MT have data to be transmitted, the IAB-MT may only report the first one of the second buffer status report MAC CEs, wherein bits to which LCG0, LCG8 and LCG10 correspond are set to be 1, and buffer size fields to which LCG0, LCG8 and LCG10 correspond are present, which may save the signaling overhead of MAC CEs; and if LCG0, LCG8 and LCG32 of the IAB-MT have data to be transmitted, the IAB-MT needs that both the first one of the second buffer status report MAC CEs and the second one of the second buffer status report MAC CEs report, wherein buffer size fields to which LCG0 and LCG8 in the first buffer status report MAC CE correspond are present, and a buffer size field to which LCG32 in the second buffer status report MAC CE corresponds is present.

In the embodiment of this disclosure, the IAB-node may determine a format of the generated buffer status report MAC CE according to a specific situation, such as determining whether to use the format of the buffer status report MAC CE described in Embodiment 1 of this disclosure, i.e. the format of the new buffer status report MAC CE (New BSR MAC CE), and the method for report, or a format and method for report of a legacy buffer status report MAC CE (legacy BSR MAC CE), such as the format of the buffer status report MAC CE and the method for report in Release 15 or Release 16. The new buffer status report MAC CE here includes the new truncated buffer status report MAC CE.

In the embodiment of this disclosure, as shown in FIG. 5, the method may further include:

step 503: determining a format of the generated buffer status report MAC CE according to configuration information received from a donor CU and/or according to a capability of the IAB-MT.

For example, the buffer status report MAC CE is generated in the method described in Embodiment 1 of this disclosure when at least one of the following conditions is satisfied that:

a maximum value of a configured logical channel group identity is greater than a first threshold;

the number of configured logical channels (LCHs) is greater than or equal to a second threshold;

a configured BH LCH ID adopts an expanded LCH ID;

use of an expanded LCG ranged is configured;

use of a new format of a buffer status report MAC CE is configured; and the IAB-MT supports more than 8 LCGs.

For example, when the maximum value of the configured LCG ID is less than or equal to the first threshold, the legacy BSR MAC CE format may be applied, or, if the maximum value of the configured LCG ID is greater than the first threshold, the new BSR MAC CE format and reporting method may be applied. For example, the first threshold may be an integer, such as 8 or 16;

for example, when the number of configured BH LCHs is less than or equal to the second threshold, the legacy BSR MAC CE format is applied, or, if the number of configured LCHs is greater than or equal to the second threshold, the new BSR MAC CE format and reporting method are applied;

for example, when the BH LCH ID (BH LogicalChannelIdentity) uses a legacy LCH ID (e.g. a value range is 1-32), the legacy BSR MAC CE format will be applied, or, if the configured BH LCH ID uses an extended LCH ID (e.g. a value range is 320-65855), the new BSR MAC CE format and reporting method will be applied;

for example, when the network configuration adopts an extended LCG range, the new BSR MAC CE format will be applied; or, if the configuration adopts the new BSR MAC CE format, the new BSR MAC CE format and reporting method will be applied;

for example, the determination is performed according to the capability of the IAB-MT, when the IAB-MT does not support LCGs of a number greater than a third threshold, the legacy BSR reporting and BSR MAC CE format will be used; and if the IAB-MT supports LCGs of a number greater than the third threshold, the new BSR MAC CE format and reporting method will be applied; for example, the third threshold may be an integers, such as 8, or 16, or 64, etc.

For example, IAB-MT always applies the new BSR MAC CE format and reporting method.

In the embodiment of this disclosure, the configuration information may be transmitted via RRC signaling, such as an RRC configuration message, or an RRC resume message, etc.

In addition, in the embodiment of this disclosure, the BSR MAC CE format and reporting method may be determined separately or in combination according to the configuration information and the capability of the IAB-MT.

In addition, in the embodiment of this disclosure, the UE served by the IAB-node may apply the new BSR MAC CE format or not.

In addition, in the embodiment of this disclosure, the pre-emptive BSR may also apply the new BSR MAC CE format.

It can be seen from the above embodiment that the BSR MAC CE containing information on all logical channel groups with a maximum possible number greater than 8 having data to be transmitted and at least one piece of buffer size information is generated and transmitted without performing determination of a long BSR report or a short BSR report. Thus, an effective BSR reporting mechanism may be provided for a case where a maximum number of logical channel groups exceeds 8. Moreover, as determination of a long or short BSR report by the IAB-MT in existing standards is eliminated, operations of the IAB-MT are simplified, and implementations of products are simpler. In addition, as the number of newly introduced MAC CEs is relatively small, occupation of related identities may be reduced, and complexity of system design may be lowered.

Embodiment 2

The embodiment of this disclosure provides a method for buffer status report, applicable to an IAB-node.

In the embodiment of this disclosure, whether a long buffer status report or a short buffer status report is reported is determined according to the number of logical channel groups having data to be transmitted.

For example, when the number of logical channel groups having data to be transmitted is greater than one, a long buffer status report (long BSR) is reported, which is also referred to as a new long BSR (New long BSR), or an IAB long BSR, or an extended long BSR (Extended long BSR); for a padding BSR, it reports a new long truncated buffer status report (New long truncated BSR), or an IAB long truncated buffer status report (IAB long Truncated BSR), or an extended long truncated buffer status report (Extended long Truncated BSR), etc; and for the long buffer status report or the long truncated buffer status report, a structure of its MAC CE may be identical to that of the buffer status report MAC CE or truncated buffer status report MAC CE in Embodiment 1;

and when the number of logical channel groups having data to be transmitted is not greater than one, a short buffer status report (short BSR) is reported, which is also referred to as a new short BSR (New short BSR), or an IAB short BSR, or an extended short BSR (Extended short BSR); for a padding BSR, it reports a new short truncated buffer status report (New short Truncated BSR), or an IAB short truncated buffer status report (IAB short Truncated BSR), or an extended short truncated buffer status report (Extended short Truncated BSR), etc.

That is, for example, for a regular BSR and periodic BSR, a long buffer status report MAC CE or a short buffer status report MAC CE may be generated and transmitted; and for a padding BSR, a long buffer status report MAC CE or a long truncated buffer status report MAC CE or a short truncated buffer status report or a short buffer status report may be generated and transmitted.

In the embodiment of this disclosure, the short buffer status report MAC CE (or the new short buffer status report MAC CE), the short truncated buffer status report MAC CE (or the new short truncated buffer status report MAC CE), the long buffer status report MAC CE (or the new long buffer status report MAC CE) and the long truncated buffer status report MAC CE (or the new long truncated buffer status report MAC CE) are identified by 4 logical channel identities (LCIDs) or 4 one-byte extended logical channel identities (eLCIDs).

For example, for a case where 4 LCIDs are used for identifying, values of a Codepoint and Index range from 35 to 44, such as 41-44, or 35-38.

For example, for a case where 4 one-byte eLCIDs are used for identifying, a value of a Codepoint ranges from 0 to 249, such as 246-249, and a value of an index ranges from 64 to 313, such as 310-313.

The short buffer status report shall be described below.

FIG. 8 is a schematic diagram of the method for buffer status report of Embodiment 2 of this disclosure. As shown in FIG. 8, the method includes:

step 801: generating a short buffer status report MAC CE when the number of logical channel group having data to be transmitted is not more than one, the buffer status report MAC CE containing information on a logical channel group and information on a buffer size, and a length of the short buffer status report MAC CE being 2 bytes; and step 802: transmitting the short buffer status report MAC CE.

Thus, an effective BSR reporting mechanism may be provided for the case where the maximum number of logical channel groups exceeds 8.

In the embodiment of this disclosure, a length of the information on the logical channel group is 4-8 bits, that is, the length of the LCG ID field is 4-8 bits. A length of the buffer size information, i.e. the buffer size field, is 1 byte, i.e. 8 bits.

In this way, the length of the buffer size field is increased, so that a value (index) of a buffer size field may indicate a smaller range of buffer values, thereby improving accuracy of the buffer size field, and facilitating more accurate uplink resource allocation by the IAB parent node or the IAB-donor.

In the embodiment of this disclosure, the information on the logical channel group, i.e. the LCG ID field, may be combined with a reserved bit to form a byte, and number of the reserved bit may be at least one.

For example, the information on the logical channel group, i.e. the LCG ID field, may be before or after the reserved bit, and the embodiment of this disclosure is not limited thereto.

In the embodiment of this disclosure, the information on the logical channel group may be adjacent to the buffer size information.

In the embodiment of this disclosure, a length of a subheader of the short buffer status report MAC CE is 1 byte, that is, a length of an MAC sub-PDU containing the short buffer status report MAC CE is 3 bytes. In this way, a total bytes of the MAC sub-PDU containing the short buffer status report MAC CE is relatively small, and signaling overhead is relatively low.

Figure 9:
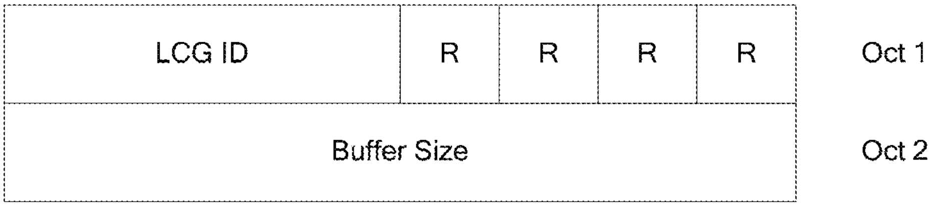
FIG. 9 is a schematic diagram of a buffer status report MAC CE of Embodiment 2 of this disclosure.

FIG. 9 is a schematic diagram of the buffer status report MAC CE of Embodiment 2 of this disclosure. As shown in FIG. 9, the length of the buffer status report MAC CE is 2 bytes, the length of the LCG ID field is 4 bits, which is combined with 4 reserved bits R to form a byte, and the length of the buffer size field is 1 byte, i.e. 8 bits. In addition, the reserved bits R may also be before the LCG ID field.

Figure 10:
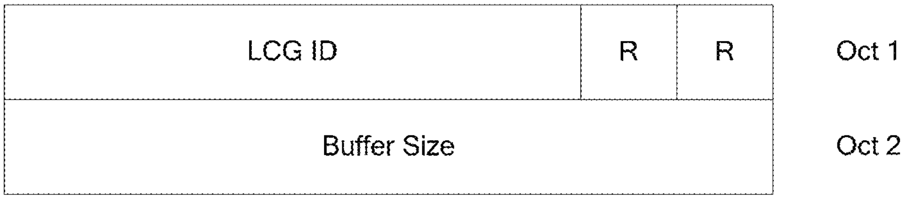
FIG. 10 is another schematic diagram of the buffer status report MAC CE of Embodiment 2 of this disclosure.

FIG. 10 is another schematic diagram of the buffer status report MAC CE of Embodiment 2 of this disclosure. As shown in FIG. 10, the length of the buffer status report MAC CE is 2 bytes, the length of the LCG ID field is 6 bits, which is combined with 2 reserved bits R to form a byte, and the length of the buffer size field is 1 byte, i.e. 8 bits. In addition, the reserved bits R may also be before the LCG ID field.

Figure 11:
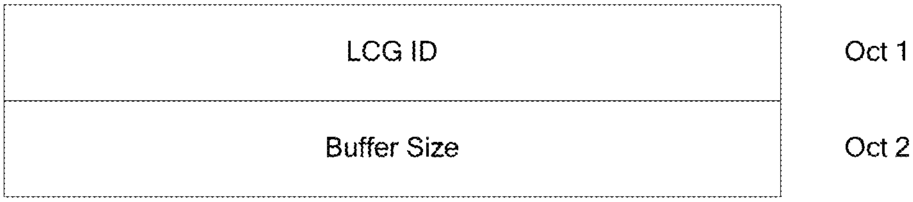
FIG. 11 is a further schematic diagram of the buffer status report MAC CE of Embodiment 2 of this disclosure.

FIG. 11 is a further schematic diagram of the buffer status report MAC CE of Embodiment 2 of this disclosure. As shown in FIG. 11, the length of the buffer status report MAC CE is 2 bytes, the length of the LCG ID field is 1 byte, i.e. 8 bits, and the length of the buffer size field is 1 byte, i.e. 8 bits.

Figure 12:
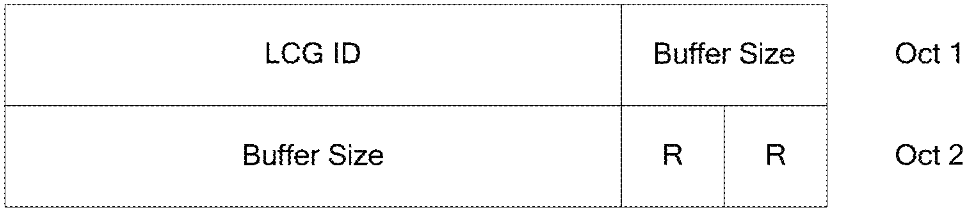
FIG. 12 is still another schematic diagram of the buffer status report MAC CE of Embodiment 2 of this disclosure.

FIG. 12 is still another schematic diagram of the short buffer status report MAC CE in Example 2 of this disclosure. As shown in FIG. 12, the length of the buffer status report MAC CE is 2 bytes, the length of the LCG ID field is 6 bytes, which is adjacent to the buffer size field, the other buffer size field and 2 reserved bits form a byte, and a total length of the buffer size field is 1 byte.

In the embodiment of this disclosure, similar to Embodiment 1, the IAB-node may also determine the format of the generated buffer status report MAC CE according to the received configuration information from the donor CU and/or the capability of the IAB-MT. Reference may be made to what is described in Embodiment 1 for particular contents, which shall not be described herein any further.

In addition, in the embodiment of this disclosure, the UE served by the IAB-node may apply the new BSR MAC CE format or not.

In addition, in the embodiment of this disclosure, the pre-emptive BSR may also apply the new BSR MAC CE format.

It can be seen from the above embodiment that when the number of logical channel groups having data to be transmitted is not greater than 1, a short BSR MAC CE of a length of 2 bytes containing information on a logical channel group and one piece of buffer size information is generated and transmitted. In this way, an effective BSR report mechanism may be provided for a case where the maximum number of logical channel groups is greater than 8. A total bytes of the MAC sub-PDU containing the short buffer status report MAC CE is relatively small, and signaling overhead is relatively low. And the length of the buffer size field is increased, so that a value (index) of a buffer size field may indicate a smaller range of buffer values, thereby improving accuracy of the buffer size field, and facilitating more accurate uplink resource allocation by the IAB parent node or the IAB-donor.

Embodiment 3

The embodiment of this disclosure provides a method for buffer status report, applicable to an IAB-node.

In the embodiment of this disclosure, whether a long buffer status report or a short buffer status report is reported is determined according to the number of logical channel groups having data to be transmitted.

For example, when the number of logical channel groups having data to be transmitted is greater than N, a long buffer status report (long BSR) is reported, which is also referred to as a new long BSR, or an IAB long BSR, or an extended long BSR; for a padding BSR, it reports a new long truncated buffer status report (New long truncated BSR), or an IAB long truncated buffer status report (IAB long Truncated BSR), or an extended long truncated buffer status report (Extended long Truncated BSR), etc; and for the long buffer status report or the long truncated buffer status report, a structure of its MAC CE may be identical to that of the buffer status report MAC CE or truncated buffer status report MAC CE in Embodiment 1;

and when the number of logical channel groups having data to be transmitted is not greater than N, a short buffer status report (short BSR) is reported, which is also referred to as a new short BSR, or an IAB short BSR, or an extended short BSR (Extended short BSR); for a padding BSR, it reports a short truncated buffer status report (New short Truncated BSR), or an IAB short truncated buffer status report (IAB short Truncated BSR), or an extended short truncated buffer status report (Extended short Truncated BSR), etc.

That is, for example, for a regular BSR and periodic BSR, a long buffer status report MAC CE or a short buffer status report MAC CE may be generated and transmitted; and for a padding BSR, a long buffer status report MAC CE or a long truncated buffer status report MAC CE or a short truncated buffer status report or a short buffer status report may be generated and transmitted.

In the embodiment of this disclosure, the short buffer status report MAC CE (or the new short buffer status report MAC CE), the short truncated buffer status report MAC CE (or the new short truncated buffer status report MAC CE), the long buffer status report MAC CE (or the new long buffer status report MAC CE) and the long truncated buffer status report MAC CE (or the new long truncated buffer status report MAC CE) are identified by 4 logical channel identities (LCIDs) or 4 one-byte extended logical channel identities (eLCIDs).

For example, for a case where 4 LCIDs are used for identifying, values of a Codepoint and Index range from 35 to 44, such as 41-44, or 35-38.

For example, for a case where 4 one-byte eLCIDs are used for identifying, a value of a Codepoint ranges from 0 to 249, such as 246-249, and a value of an index ranges from 64 to 313, such as 310-313.

The short buffer status report shall be described below.

Figure 13:
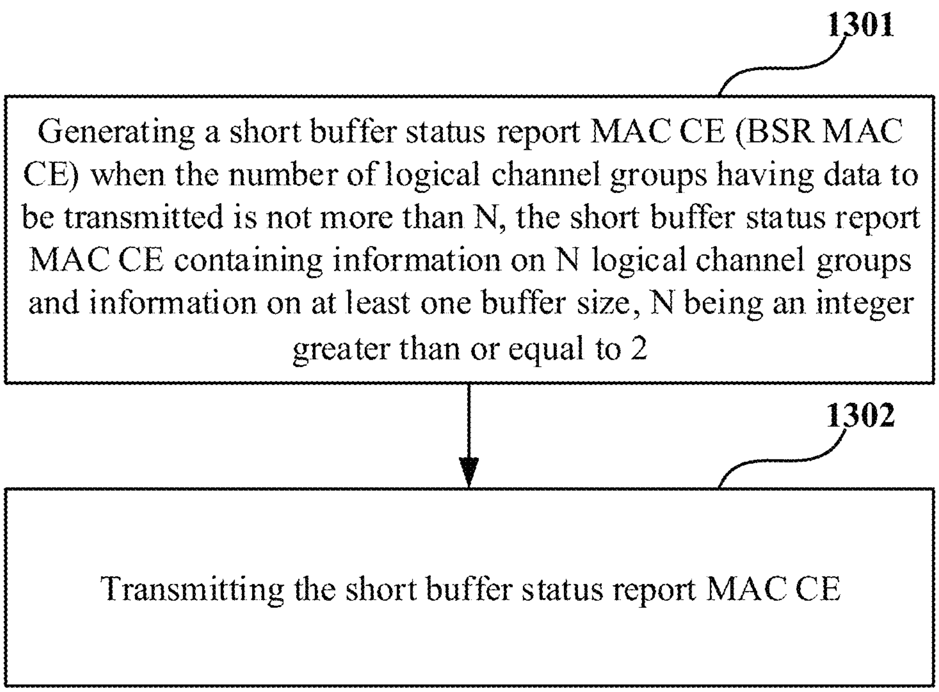
FIG. 13 is a schematic diagram of the method for buffer status report of Embodiment 3 of this disclosure.

FIG. 13 is a schematic diagram of the method for buffer status report of Embodiment 3 of this disclosure. As shown in FIG. 13, the method includes:

step 1301: generating a short buffer status report MAC CE (BSR MAC CE) when the number of logical channel groups having data to be transmitted is not more than N, the short buffer status report MAC CE containing information on N logical channel groups and information on at least one buffer size, N being an integer greater than or equal to 2; and step 1302: transmitting the short buffer status report MAC CE.

Thus, an effective BSR reporting mechanism may be provided for cases where the maximum number of logical channel groups exceeds 8.

Moreover, taken as a relay node in the network, the IAB-node usually serves for relatively more UEs and/or IAB descendant nodes. Therefore, the IAB-MT usually has more than one logical channel groups having data to be transmitted, but sometimes it have only a small number of logical channel groups having data to be transmitted, in which case the short buffer status report MAC CE format in this embodiment may be adopted, thereby reducing signaling overhead and saving radio resources compared to transmitting a long buffer status report MAC CE.

In the embodiment of this disclosure, a length of the information on the logical channel groups is 4 to 8 bits.

In the embodiment of this disclosure, the information on the at least N logical channel groups, i.e. the LCGi field, is located in the same byte or different bytes, and i ranges from 0 to N−1, or, it may also be referred to as an LCG ID field, which is expressed as LCG ID a, LCG ID b, . . . .

In the embodiment of this disclosure, in the short buffer status report MAC CE or the new short buffer status report MAC CE or the short truncated buffer status report MAC CE or the new short truncated buffer status report MAC CE, information on at least one logical channel group in the information on the at least N logical channel groups is adjacent to buffer size information corresponding thereto, and/or, information on at least two logical channel groups in the information on the at least N logical channel groups is adjacent to each other, and/or, at least two pieces of buffer size information, i.e. buffer size fields, are adjacent to each other.

In the embodiment of this disclosure, all the LCG ID fields may be placed before the bytes, or may be adjacent to corresponding buffer sizes. If all the LCG ID fields are placed foremost, an order of a buffer size to which an LCG corresponds in the buffer size field is identical to an order of the LCG in the LCG ID field.

For example, for a case where N is 2, description in corresponding standards may be:

For Regular and Periodic BSR, the MAC entity shall:
1>if more than two LCG has data available for transmission when the MAC PDU containing the BSR is to be built:
2>report New Long BSR for all LCGs which have data available for transmission.
1>else:
2>report New Short BSR.
For Padding BSR, the MAC entity shall:
1>if the number of padding bits is equal to or larger than the size of the New Short BSR plus its subheader but smaller than the size of the New Long BSR plus its subheader:
2>if more than two LCG has data available for transmission when the BSR is to be built:
3>if the number of padding bits is equal to the size of the New Short BSR plus its subheader:
4> report New Short Truncated BSR of the two LCGs with the logical channels having data available for transmission following a decreasing order of the highest priority logical channel.
3>else:
4>report New Long Truncated BSR of the LCG(s) with the logical channels having data available for transmission following a decreasing order of the highest priority logical channel (with or without data available for transmission) in each of these LCG(s), and in case of equal priority, in increasing order of LCGID.
2>else:
3>report New Short BSR.
1>else if the number of padding bits is equal to or larger than the size of the New Long BSR plus its subheader:
2>report New Long BSR for all LCGs which have data available for transmission.

The format of the short buffer status report MAC CE in a case where N is 2 shall be illustrated below. Cases where N is greater than 2 may be similar to the case where N is 2.

Figure 14:
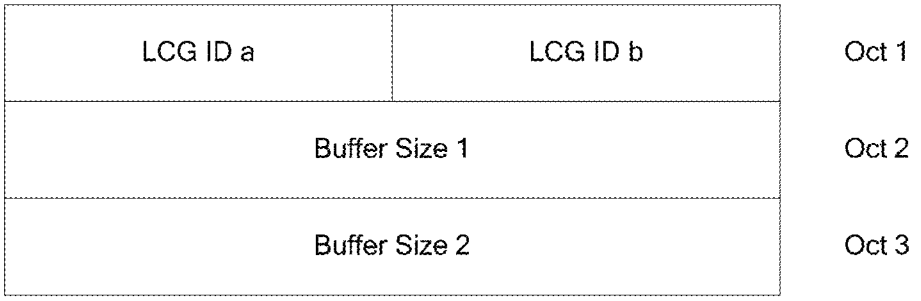
FIG. 14 is a schematic diagram of a buffer status report MAC CE of Embodiment 3 of this disclosure.

FIG. 14 is a schematic diagram of the buffer status report MAC CE of Embodiment 3 of this disclosure. As shown in FIG. 14, a length of the buffer status report MAC CE is 3 bytes, which includes information on two logical channel groups, i.e. LCG ID fields, and two pieces of buffer size information, i.e. buffer size fields. The two LCG ID fields are LCG ID a and LCG ID b, respectively, lengths of them being 4 bits, LCG ID a and LCG ID b forming a byte, buffer size 1 field containing buffer size information to which LCG ID a corresponds, and buffer size 2 field containing buffer size information to which LCG ID b corresponds.

Figure 15:
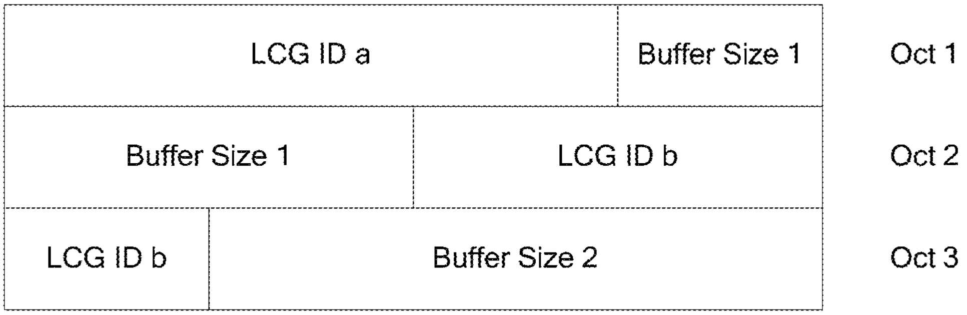
FIG. 15 is another schematic diagram of the buffer status report MAC CE of Embodiment 3 of this disclosure.

FIG. 15 is another schematic diagram of the buffer status report MAC CE of Embodiment 3 of this disclosure. As shown in FIG. 15, the length of the buffer status report MAC CE is 3 bytes, which includes information on two logical channel groups, i.e. LCG ID fields, and two pieces of buffer size information, i.e. buffer size fields. The two LCG ID fields are LCG ID a and LCG ID b, respectively, lengths of them being 6 bits, LCG ID a and one part of a first buffer size field forming a first byte, the other part of the first buffer size field and one part of LCG ID b forming a second byte, the other part of LCG ID b and a second buffer size field forming a third byte, buffer size 1 field containing buffer size information to which LCG ID a corresponds, and buffer size 2 field containing buffer size information to which LCG ID b corresponds.

Figure 16:
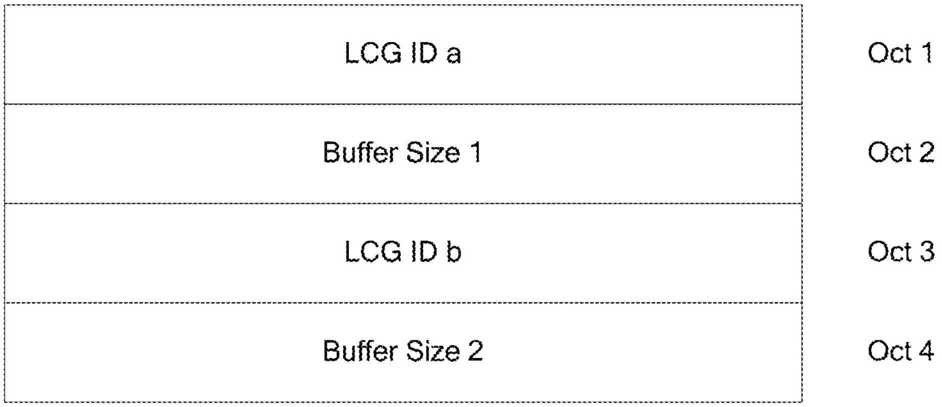
FIG. 16 is a further schematic diagram of the buffer status report MAC CE of Embodiment 3 of this disclosure.

FIG. 16 is a further schematic diagram of the buffer status report MAC CE of Embodiment 3 of this disclosure. As shown in FIG. 16, the length of the buffer status report MAC CE is 3 bytes, which includes information on two logical channel groups, i.e. LCG ID fields, and two pieces of buffer size information, i.e. buffer size fields. The two LCG ID fields are LCG ID a and LCG ID b, respectively, lengths of them being 1 byte, i.e. 8 bits, lengths of the two buffer size fields being also 1 byte, i.e. 8 bits, buffer size 1 field containing buffer size information to which LCG ID a corresponds, and buffer size 2 field containing buffer size information to which LCG ID b corresponds.

In the embodiment of this disclosure, for the case where N is 8, the information on the 8 logical channel groups contained in the short buffer status report MAC CE forms a byte. That is, the short buffer status report MAC CE may adopt a format of an existing long buffer status report MAC CE.

Figure 17:
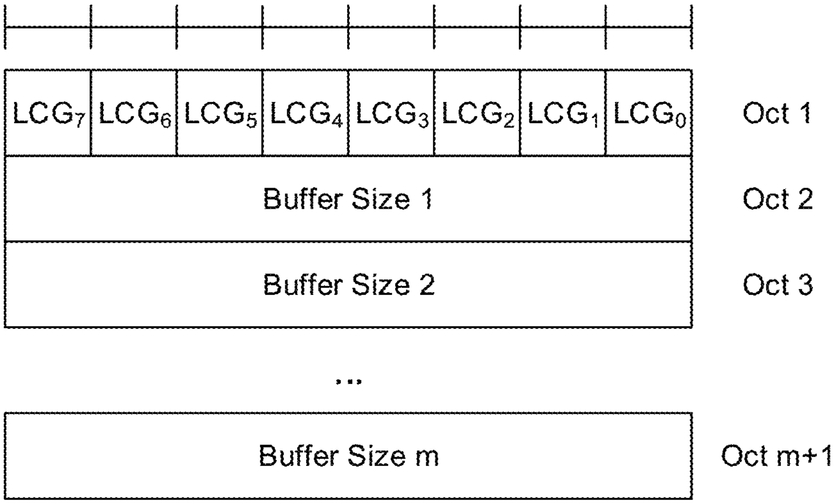
FIG. 17 is still another schematic diagram of the buffer status report MAC CE of Embodiment 3 of this disclosure.

FIG. 17 is still another schematic diagram of the buffer status report MAC CE of Embodiment 3 of this disclosure. As shown in FIG. 17, a maximum number of logical channel groups reporting the buffer report is 8, 8 LCGi fields form 1 byte, and lengths of the LCGi fields are 1 bit, i being 0-7.

In the embodiment of this disclosure, similar to Embodiment 1, the IAB-node may also determine the format of the generated buffer status report MAC CE according to the received configuration information from the donor CU and/or the capability of the IAB-MT. Reference may be made to what is described in Embodiment 1 for particular contents, which shall not be described herein any further.

In addition, in the embodiment of this disclosure, the UE served by the IAB-node may apply the new BSR MAC CE format or not.

In addition, in the embodiment of this disclosure, the pre-emptive BSR may also apply the new BSR MAC CE format.

It can be seen from the above embodiment that an effective BSR report mechanism may be provided for a case where the maximum number of logical channel groups is greater than 8. Moreover, taken as a relay node in the network, the IAB-node usually serves for relatively more UEs and/or IAB descendant nodes. Therefore, the IAB-MT usually has more than one logical channel groups having data to be transmitted, but sometimes it have only a small number of logical channel groups having data to be transmitted, in which case the short buffer status report MAC CE format in this embodiment may be adopted, thereby reducing signaling overhead and saving radio resources compared to transmitting a long buffer status report MAC CE.

Embodiment 4

The embodiment of this disclosure provides a method for configuring buffer status report, applicable to an IAB-donor. This method corresponds to embodiments 1-3, and reference may be made to what is described in embodiments 1-3 for identical contents.

Figure 18:
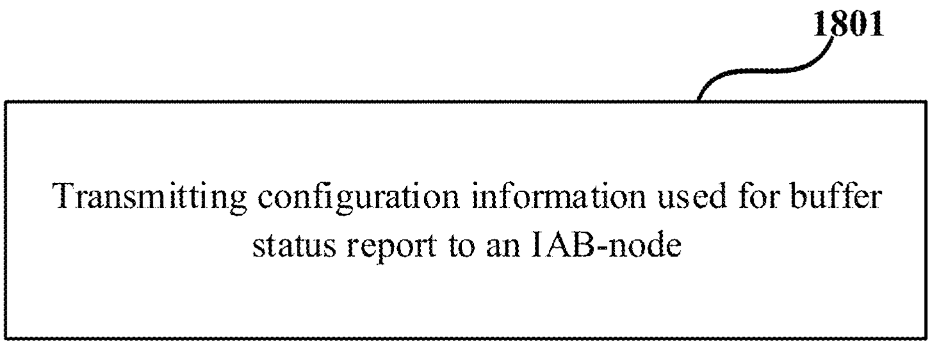
FIG. 18 is a schematic diagram of the method for configuring buffer status report of Embodiment 5 of this disclosure.

FIG. 18 is a schematic diagram of the method for configuring buffer status report of Embodiment 5 of this disclosure. As shown in FIG. 18, the method includes:

step 1801: transmitting configuration information used for buffer status report to an IAB-node, the configuration information including at least one of the following:

a configured logical channel group identity, the number of configured logical channels (LCHs), a configured BH LCH ID, configuring whether an extended LCG range is adopted, and configuring whether a new buffer status report MAC CE format is adopted.

In this way, the IAB-node may determine the format of the generated buffer status report MAC CE according to the configuration information and/or the capability of the IAB-MT.

For example, the configured BH LCH ID adopts an extended LCH ID, and/or, adopting an extended LCG range is configured, and/or, adopting a new buffer status report MAC CE format is configured. In this case, the IAB-node generates the BSR MAC CE by apply the new BSR MAC CE format, i.e. by using the method described in any one of embodiments 1-3.

For example, the configuration information is transmitted via RRC signaling.

It can be seen from the above embodiment that by transmitting the configuration information for buffer status report to the IAB-node, the IAB-node may determine the format of the generated buffer status report MAC CE according to the configuration information and/or the capability of the IAB-MT. Thus, an effective BSR reporting mechanism may be provided for a case where a maximum number of logical channel groups exceeds 8.

Embodiment 5

The embodiment of this disclosure provides a method for buffer status report, applicable to an IAB-node and an IAB-donor. This method corresponds to embodiments 1-4, and reference may be made to what is described in embodiments 1~4 for identical contents.

Figure 19:
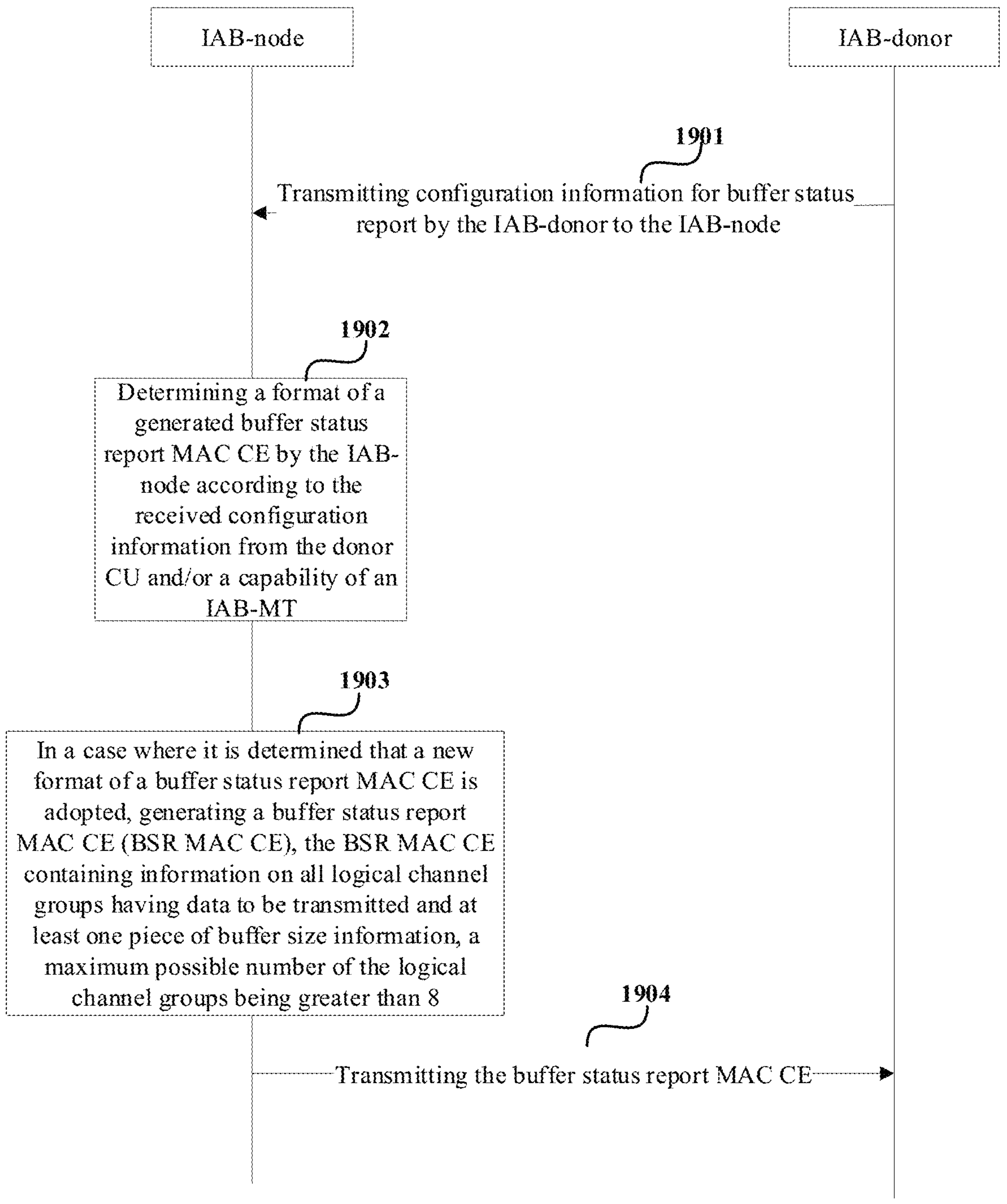
FIG. 19 is a schematic diagram of the method for buffer status report of Embodiment 5 of this disclosure.

FIG. 19 is a schematic diagram of the method for buffer status report of Embodiment 5 of this disclosure. As shown in FIG. 19, the method includes:

step 1901: transmitting configuration information for buffer status report by the IAB-donor to the IAB-node;

step 1902: determining a format of a generated buffer status report MAC CE by the IAB-node according to the received configuration information from the donor CU and/or a capability of an IAB-MT;

step 1903: in a case where it is determined that a new format of a buffer status report MAC CE is adopted, generating a buffer status report MAC CE (BSR MAC CE), the BSR MAC CE containing information on all logical channel groups having data to be transmitted and at least one piece of buffer size information, a maximum possible number of the logical channel groups being greater than 8; and step 1904: transmitting the buffer status report MAC CE.

In the embodiment of this disclosure, step 1901 is optional. For example, when the IAB-node determines the format of the generated buffer status report MAC CE according to the capability of the IAB-MT, network configuration may not be needed, that is, the IAB-donor is not needed to transmit the configuration information for buffer status report.

In addition, in the embodiment of this disclosure, it is also possible not to directly receive the configuration information from the IAB-donor and transmit the buffer status report MAC CE to the IAB-donor. For example, the configuration information may be received from a parent node of the IAB-node and the buffer status report MAC CE may be transmitted to the parent node, that is, the parent node of the IAB-node may be taken as a relay for the configuration information and the buffer status report MAC CE.

In the embodiment of this disclosure, reference may be made to what is described in Embodiment 1 for particular implementations of steps 1901-1904, which shall not be repeated herein any further.

Figure 20:
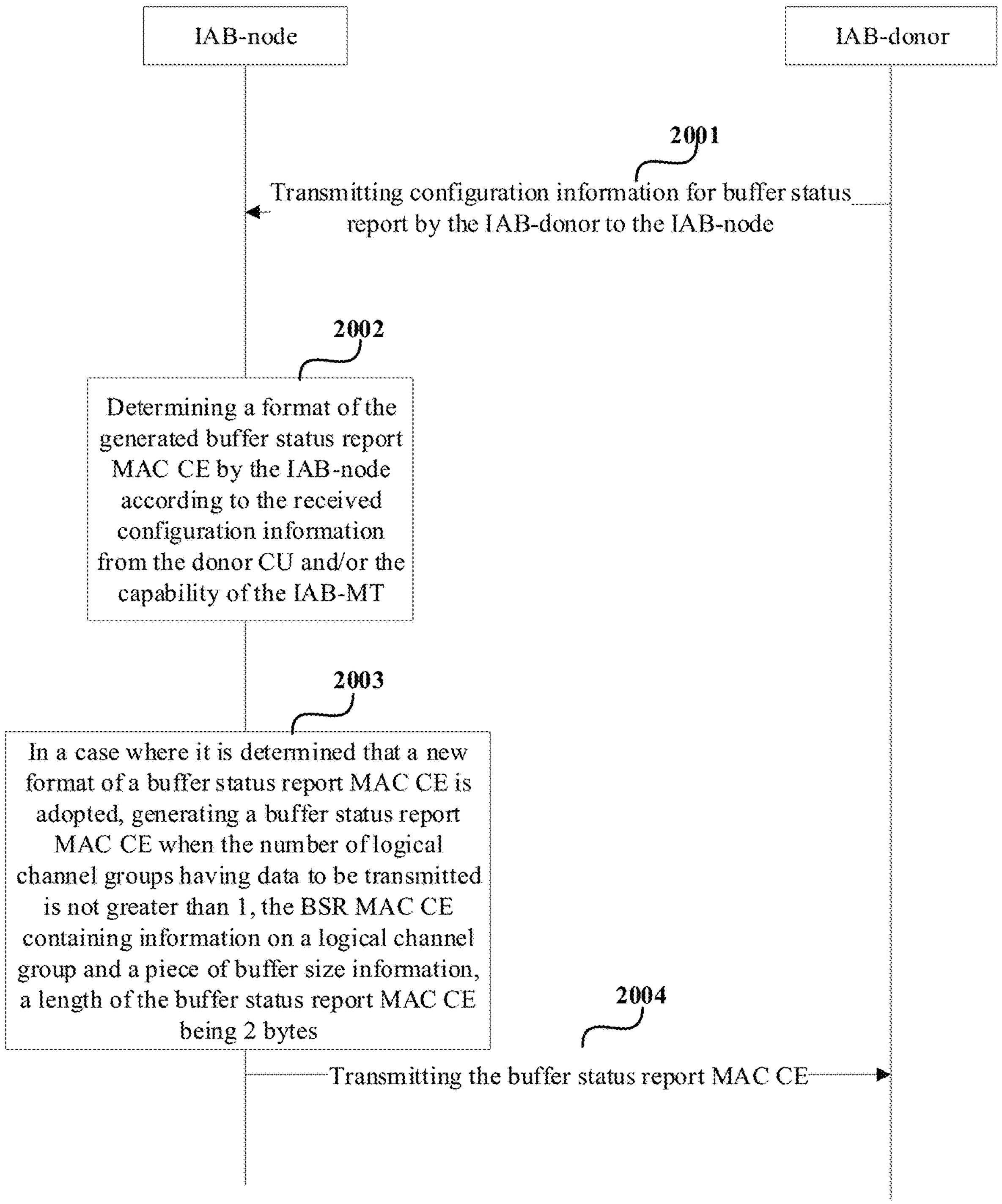
FIG. 20 is a schematic diagram of the method for buffer status report of Embodiment 5 of this disclosure.

FIG. 20 is a schematic diagram of the method for buffer status report of Embodiment 5 of this disclosure. As shown in FIG. 20, the method includes:

step 2001: transmitting configuration information for buffer status report by the IAB-donor to the IAB-node;

step 2002: determining a format of the generated buffer status report MAC CE by the IAB-node according to the received configuration information from the donor CU and/or the capability of the IAB-MT;

step 2003: in a case where it is determined that a new format of a buffer status report MAC CE is adopted, generating a buffer status report MAC CE when the number of logical channel groups having data to be transmitted is not greater than 1, the BSR MAC CE containing information on a logical channel group and a piece of buffer size information, a length of the buffer status report MAC CE being 2 bytes; and step 2004: transmitting the buffer status report MAC CE.

In the embodiment of this disclosure, step 2001 is optional. For example, when the IAB-node determines the format of the generated buffer status report MAC CE according to the capability of the IAB-MT, network configuration may not be needed, that is, the IAB-donor is not needed to transmit the configuration information for buffer status report.

In addition, in the embodiment of this disclosure, it is also possible not to directly receive the configuration information from the IAB-donor and transmit the buffer status report MAC CE to the IAB-donor. For example, the configuration information may be received from a parent node of the IAB-node and the buffer status report MAC CE may be transmitted to the parent node, that is, the parent node of the IAB-node may be taken as a relay for the configuration information and the buffer status report MAC CE.

In the embodiment of this disclosure, reference may be made to what is described in Embodiment 2 for particular implementations of steps 2001-2004, which shall not be repeated herein any further.

Figure 21:
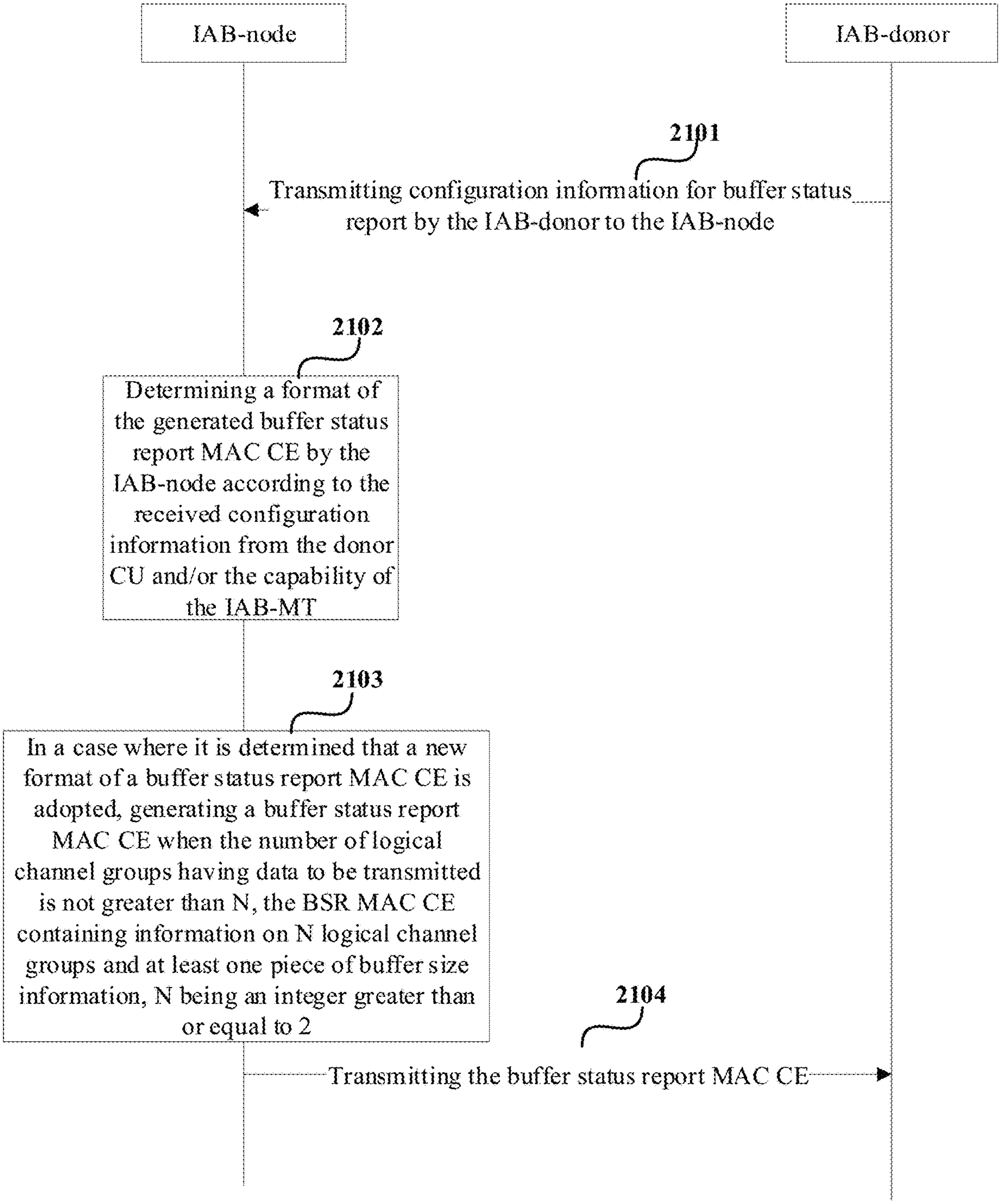
FIG. 21 is a schematic diagram of the method for buffer status report of Embodiment 5 of this disclosure.

FIG. 21 is a schematic diagram of the method for buffer status report of Embodiment 5 of this disclosure. As shown in FIG. 21, the method includes:

step 2101: transmitting configuration information for buffer status report by the IAB-donor to the IAB-node;

step 2102: determining a format of the generated buffer status report MAC CE by the IAB-node according to the received configuration information from the donor CU and/or the capability of the IAB-MT;

step 2103: in a case where it is determined that a new format of a buffer status report MAC CE is adopted, generating a buffer status report MAC CE when the number of logical channel groups having data to be transmitted is not greater than N, the BSR MAC CE containing information on N logical channel groups and at least one piece of buffer size information, N being an integer greater than or equal to 2; and step 2104: transmitting the buffer status report MAC CE.

In the embodiment of this disclosure, step 2101 is optional. For example, when the IAB-node determines the format of the generated buffer status report MAC CE according to the capability of the IAB-MT, network configuration may not be needed, that is, the IAB-donor is not needed to transmit the configuration information for buffer status report.

In addition, in the embodiment of this disclosure, it is also possible not to directly receive the configuration information from the IAB-donor and transmit the buffer status report MAC CE to the IAB-donor. For example, the configuration information may be received from a parent node of the IAB-node and the buffer status report MAC CE may be transmitted to the parent node, that is, the parent node of the IAB-node may be taken as a relay for the configuration information and the buffer status report MAC CE.

In the embodiment of this disclosure, reference may be made to what is described in Embodiment 1 for particular implementations of steps 2101-2104, which shall not be repeated herein any further.

It can be seen from the above embodiment that an effective BSR report mechanism may be provided for a case where the maximum number of logical channel groups is greater than 8.

Embodiment 6

The embodiment of this disclosure provides an apparatus for buffer status report, applicable to an IAB-node. As a principle of the apparatus for solving problems is similar to that of the method in Embodiment 1, reference may be made to the implementation of the method in Embodiment 1 for implementation of the apparatus, with identical contents being not going to be repeated herein any further.

Figure 22:
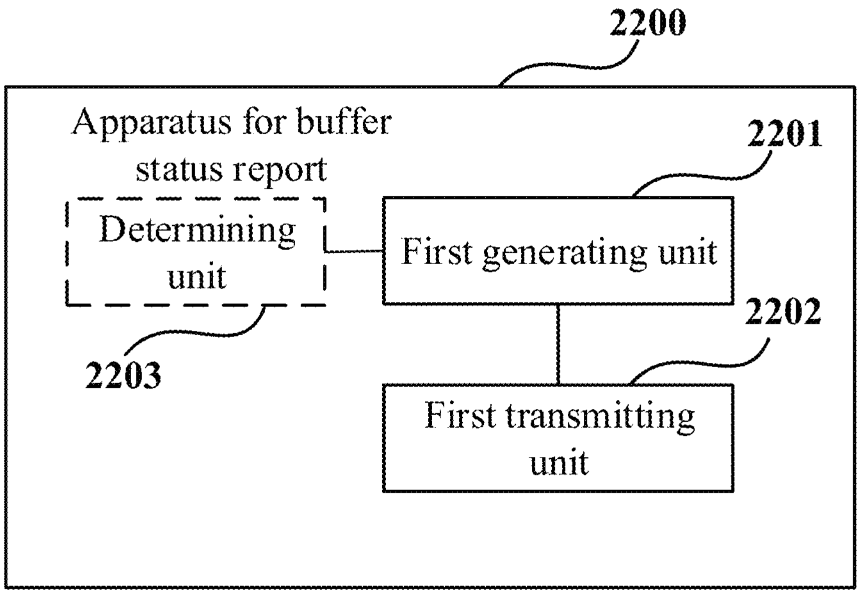
FIG. 22 is a schematic diagram of the apparatus for buffer status report of Embodiment 6 of this disclosure.

FIG. 22 is a schematic diagram of the apparatus for buffer status report of Embodiment 6 of this disclosure. As shown in FIG. 22, an apparatus 2200 includes:

a first generating unit 2201 configured to generate a buffer status report (BSR) MAC CE, the buffer status report MAC CE containing information on all logical channel groups having data to be transmitted and information on at least one buffer size, a maximum possible number of the logical channel groups being greater than 8; and a first transmitting unit 2202 configured to transmit the buffer status report MAC CE.

In the embodiment of this disclosure, when the number of padding bits is greater than or equal to a size of the buffer status report MAC CE plus a size of its subheader, the buffer status report MAC CE contains information on all logical channel groups having data to be transmitted and information on buffer sizes to which the logical channel groups correspond.

In the embodiment of this disclosure, the buffer status report may a truncated buffer status report, and when the number of padding bits is less than the size of the buffer status report MAC CE plus the size of its subheader, the buffer status report MAC CE contains information on logical channel groups not more than the number of padding bits and having data to be transmitted and information on a buffer size to which at least one logical channel group corresponds.

In the embodiment of this disclosure, the buffer status report MAC CE may include a first buffer status report MAC CE, the first buffer status report MAC CE indicating whether information on a buffer size to which a logical channel group corresponds is reported or whether a logical channel group has data to be transmitted via a bitmap.

In the embodiment of this disclosure, two logical channel identities (LCIDs) or an extended logical channel identity (eLCID) of one byte are/is used to identify whether the first buffer status report MAC CE is a buffer status report MAC CE or a truncated buffer status report MAC CE.

In the embodiment of this disclosure, the buffer status report MAC CE may include at least two second buffer status report MAC CEs, the at least two second buffer status report MAC CEs jointly containing information on all logical channel groups having data to be transmitted.

In the embodiment of this disclosure, a second buffer status report MAC CE is identified by a logical channel identity.

In the embodiment of this disclosure, different second buffer status report MAC CEs are identified by different logical channel identities.

In the embodiment of this disclosure, as shown in FIG. 22, the apparatus 2200 may further include:

a determining unit 2203 configured to determine a format of a generated buffer status report MAC CE according to configuration information received from a donor CU and/or according to a capability of an IAB-MT.

It can be seen from the above embodiment that the BSR MAC CE containing information on all logical channel groups with a maximum possible number greater than 8 having data to be transmitted and at least one piece of buffer size information is generated and transmitted without performing determination of a long BSR report or a short BSR report. Thus, an effective BSR reporting mechanism may be provided for a case where a maximum number of logical channel groups exceeds 8. Moreover, as determination of a long or short BSR report by the IAB-MT in existing standards is eliminated, operations of the IAB-MT are simplified, and implementations of products are simpler. In addition, as the number of newly introduced MAC CEs is relatively small, occupation of related identities may be reduced, and complexity of system design may be lowered.

Embodiment 7

The embodiment of this disclosure provides an apparatus for buffer status report, applicable to an IAB-node. As a principle of the apparatus for solving problems is similar to that of the method in Embodiment 2, reference may be made to the implementation of the method in Embodiment 2 for implementation of the apparatus, with identical contents being not going to be repeated herein any further.

Figure 23:
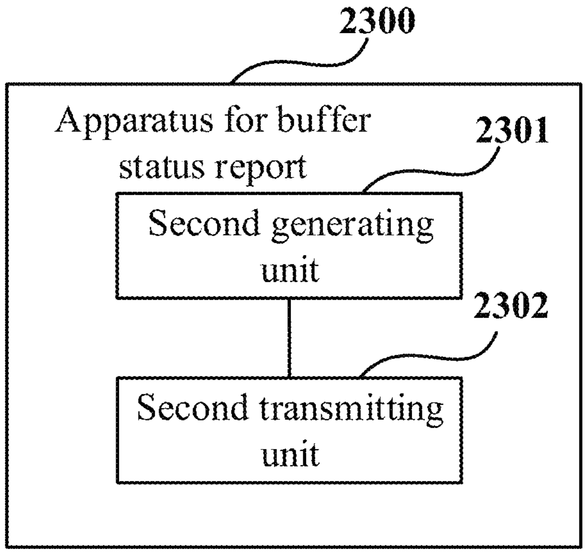
FIG. 23 is a schematic diagram of the apparatus for buffer status report of Embodiment 7 of this disclosure.

FIG. 23 is a schematic diagram of the apparatus for buffer status report of Embodiment 7 of this disclosure. As shown in FIG. 23, an apparatus 2300 includes:

a second generating unit 2301 configured to generate a short buffer status report MAC CE when the number of logical channel group having data to be transmitted is not more than one, the buffer status report MAC CE containing information on a logical channel group and information on a buffer size, and a length of the short buffer status report MAC CE being 2 bytes; and a second transmitting unit 2302 configured to transmit the short buffer status report MAC CE.

In the embodiment of this disclosure, a length of the information on the logical channel group may 4 to 8 bits.

In the embodiment of this disclosure, the information on the logical channel group and a reserved bit constitute a byte.

In the embodiment of this disclosure, the information on the logical channel group may be before or after the reserved bit.

In the embodiment of this disclosure, the information on the logical channel group may be adjacent to the information on a buffer size.

In the embodiment of this disclosure, a length of a subheader of the short buffer status report MAC CE may be one byte, and a length of an MAC sub-PDU containing the short buffer status report MAC CE is three bytes. And in the embodiment of this disclosure, the apparatus 2300 may further include units having functions identical to those of the determining unit 2203.

It can be seen from the above embodiment that when the number of logical channel groups having data to be transmitted is not greater than 1, a short BSR MAC CE of a length of 2 bytes containing information on a logical channel group and one piece of buffer size information is generated and transmitted. In this way, an effective BSR report mechanism may be provided for a case where the maximum number of logical channel groups is greater than 8. A total bytes of the MAC sub-PDU containing the short buffer status report MAC CE is relatively small, and signaling overhead is relatively low. And the length of the buffer size field is increased, so that a value (index) of a buffer size field may indicate a smaller range of buffer values, thereby improving accuracy of the buffer size field, and facilitating more accurate uplink resource allocation by the IAB parent node or the IAB-donor.

Embodiment 8

The embodiment of this disclosure provides an apparatus for buffer status report, applicable to an IAB-node. As a principle of the apparatus for solving problems is similar to that of the method in Embodiment 3, reference may be made to the implementation of the method in Embodiment 3 for implementation of the apparatus, with identical contents being not going to be repeated herein any further.

Figure 24:
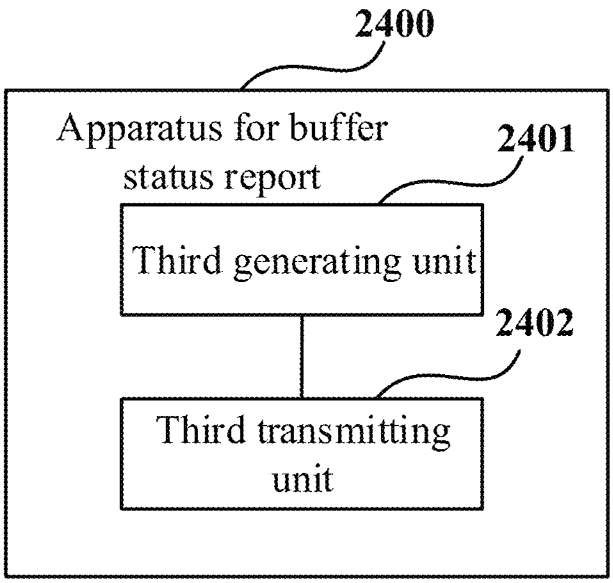
FIG. 24 is a schematic diagram of the apparatus for buffer status report of Embodiment 8 of this disclosure.

FIG. 24 is a schematic diagram of the apparatus for buffer status report of Embodiment 8 of this disclosure. As shown in FIG. 24, an apparatus 2400 includes:

a third generating unit 2401 configured to generate a short buffer status report (BSR) MAC CE when the number of logical channel groups having data to be transmitted is not more than N, the short buffer status report MAC CE containing information on N logical channel groups and information on at least one buffer size, N being an integer greater than or equal to 2; and a third transmitting unit 2402 configured to transmit the short buffer status report MAC CE.

In the embodiment of this disclosure, a length of the information on the logical channel group may be 4 to 8 bytes.

In the embodiment of this disclosure, the information on N logical channel groups may be located in the same byte or in different bytes.

In the embodiment of this disclosure, in the short buffer status report MAC CE or the new short buffer status report MAC CE or the short truncated buffer status report MAC CE or the new short truncated buffer status report MAC CE, information on at least one logical channel group in the information on the at least N logical channel groups is adjacent to buffer size information corresponding thereto, and/or, information on at least two logical channel groups in the information on the at least N logical channel groups is adjacent to each other, and/or, at least two pieces of buffer size information, i.e. buffer size fields, are adjacent to each other.

In the embodiment of this disclosure, for example, N is 8, and information on 8 logical channel groups contained in the short buffer status report MAC CE constitutes a byte.

In the embodiment of this disclosure, the apparatus 2400 may further include units having functions identical to those of the determining unit 2203.

It can be seen from the above embodiment that an effective BSR report mechanism may be provided for a case where the maximum number of logical channel groups is greater than 8. Moreover, taken as a relay node in the network, the IAB-node usually serves for relatively more UEs and/or IAB descendant nodes. Therefore, the IAB-MT usually has more than one logical channel groups having data to be transmitted, but sometimes it have only a small number of logical channel groups having data to be transmitted, in which case the short buffer status report MAC CE format in this embodiment may be adopted, thereby reducing signaling overhead and saving radio resources compared to transmitting a long buffer status report MAC CE.

Embodiment 9

The embodiment of this disclosure provides an apparatus for configuring buffer status report, applicable to an IAB-donor. As a principle of the apparatus for solving problems is similar to that of the method in Embodiment 4, reference may be made to the implementation of the method in Embodiment 4 for implementation of the apparatus, with identical contents being not going to be repeated herein any further.

Figure 25:
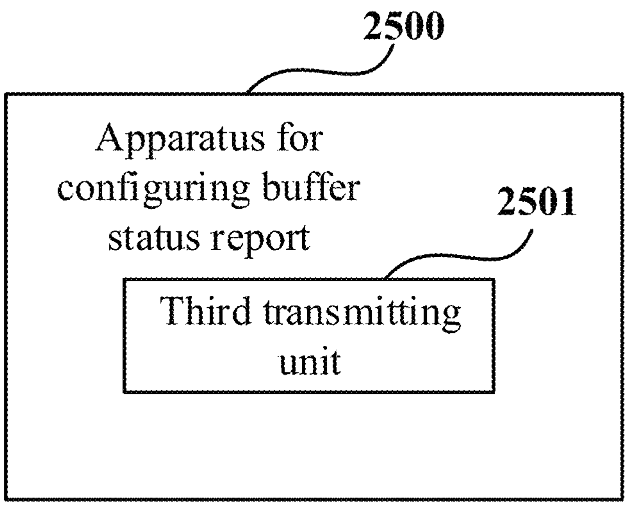
FIG. 25 is a schematic diagram of the apparatus for configuring buffer status report of Embodiment 9 of this disclosure.

FIG. 25 is a schematic diagram of the apparatus for configuring buffer status report of Embodiment 9 of this disclosure. As shown in FIG. 25, an apparatus 2500 includes: a transmitting unit 2501 configured to transmit configuration information used for buffer status report to an IAB-node, the configuration information including at least one of the following:

a configured logical channel group identity, the number of configured logical channels (LCHs), a configured BH LCH ID, configuring whether an extended LCG range is adopted, and configuring whether a new buffer status report MAC CE format is adopted.

For example, the configured BH LCH ID adopts an extended LCH ID, and/or, adopting an extended LCG range is configured, and/or, adopting a new buffer status report MAC CE format is configured.

For example, the configuration information is transmitted via RRC signaling.

It can be seen from the above embodiment that by transmitting the configuration information for buffer status report to the IAB-node, the IAB-node may determine the format of the generated buffer status report MAC CE according to the configuration information and/or the capability of the IAB-MT. Thus, an effective BSR reporting mechanism may be provided for a case where a maximum number of logical channel groups exceeds 8.

Embodiment 10

The embodiment of this disclosure provides a network device, including the apparatus for buffer status report as described in Embodiment 6 or Embodiment 7 or Embodiment 8.

Figure 26:
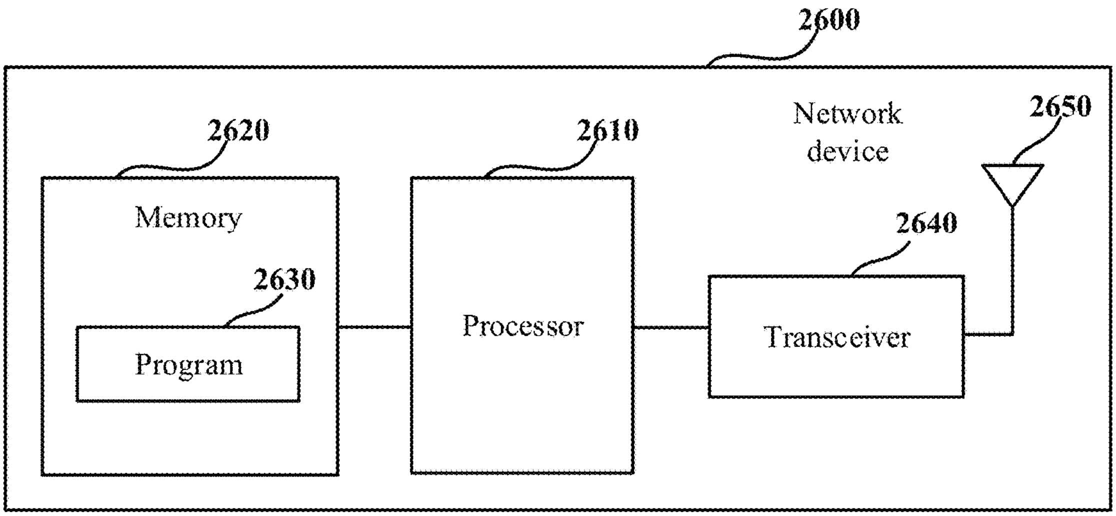
FIG. 26 is a block diagram of a systematic structure of the network device of Embodiment 10 of this disclosure.

FIG. 26 is a block diagram of a systematic structure of the network device of Embodiment 10 of this disclosure. As shown in FIG. 26, a network device 2600 may include a processor 2610 and a memory 2620, the memory 2620 being coupled to the processor 2610. It should be noted that this figure is illustrative only, and other types of structures may also be used, so as to supplement or replace this structure and achieve a telecommunications function or other functions.

In one implementation, the functions of the apparatus for buffer status report may be integrated into the processor 2610.

The processor 2610 may be configured to: generate a buffer status report MAC CE (BSR MAC CE), the buffer status report MAC CE containing information on all logical channel groups having data to be transmitted and information on at least one buffer size, a maximum possible number of the logical channel groups being greater than 8; and transmit the buffer status report MAC CE.

Or, the processor 2610 may be configured to: generate a short buffer status report MAC CE when the number of logical channel group having data to be transmitted is not more than one, the buffer status report MAC CE containing information on a logical channel group and information on a buffer size, and a length of the short buffer status report MAC CE being 2 bytes; and transmit the short buffer status report MAC CE.

Or, the processor 2610 may be configured to: generate a short buffer status report (BSR) MAC CE when the number of logical channel groups having data to be transmitted is not more than N, the short buffer status report MAC CE containing information on N logical channel groups and information on at least one buffer size, N being an integer greater than or equal to 2; and transmit the short buffer status report MAC CE.

In another implementation, the apparatus for buffer status report and the processor 2610 may be configured separately; for example, the apparatus for buffer status report may be configured as a chip connected to the processor 2610, and the functions of the apparatus for buffer status report are executed under control of the processor 2610.

Furthermore, as shown in FIG. 26, the network device 2600 may include transceiver 2640, and an antenna 2650, etc. Functions of the above components are similar to those in the related art, and shall not be described herein any further. It should be noted that the network device 2600 does not necessarily include all the parts shown in FIG. 26. Furthermore, the network device 2600 may include parts not shown in FIG. 26, and the related art may be referred to.

It can be seen from the above embodiment that the BSR MAC CE containing information on all logical channel groups with a maximum possible number greater than 8 having data to be transmitted and at least one piece of buffer size information is generated and transmitted without performing determination of a long BSR report or a short BSR report; or, when the number of logical channel groups having data to be transmitted is not greater than 1, a short BSR MAC CE of a length of 2 bytes containing information on a logical channel group and one piece of buffer size information is generated and transmitted; or, when the number of logical channel groups having data to be transmitted is not greater than N, the buffer status report MAC CE containing information on N logical channel groups and at least one piece of buffer size information is generated and transmitted, N being an integer greater than or equal to 2. Thus, an effective BSR reporting mechanism may be provided for a case where a maximum number of logical channel groups exceeds 8.

Embodiment 11

The embodiment of this disclosure provides a network device, including the apparatus for configuring buffer status report as described in Embodiment 9.

Figure 27:
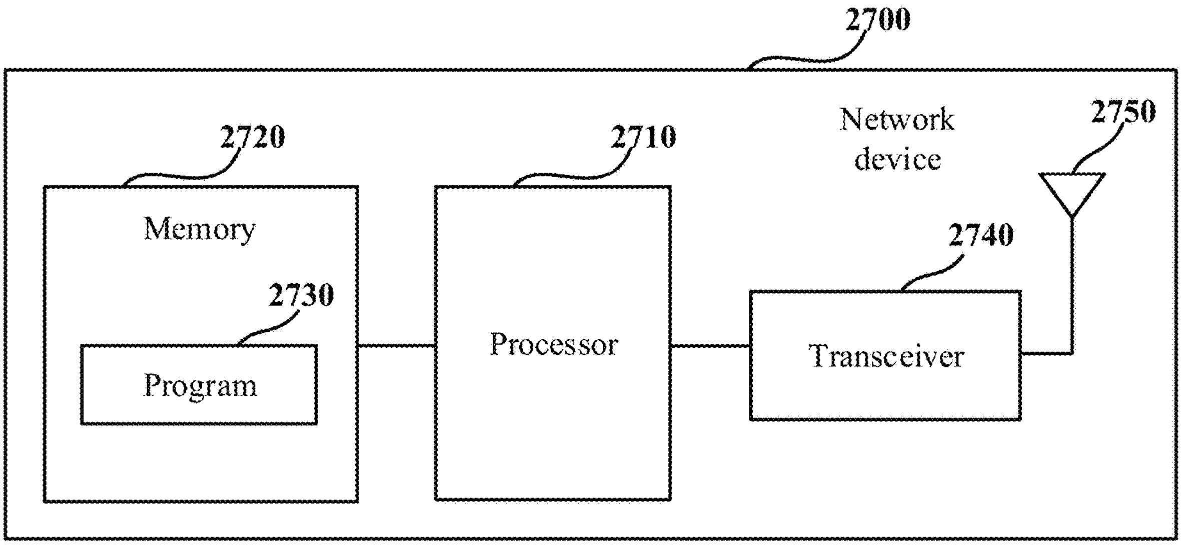
FIG. 27 is a block diagram of a systematic structure of the network device of Embodiment 11 of this disclosure.

FIG. 27 is a block diagram of a systematic structure of the network device of Embodiment 11 of this disclosure. As shown in FIG. 27, a network device 2700 may include a processor 2710 and a memory 2720, the memory 2720 being coupled to the processor 2710. Wherein, the memory 2720 may store various data, and furthermore, it may store a program 2730 for information processing, and execute the program 2730 under control of the processor 2710, so as to receive various information transmitted by a terminal equipment, and transmit various information to the terminal equipment.

In one implementation, the functions of the apparatus for configuring buffer status report may be integrated into the processor 2710. The processor 2710 may be configured to: transmit configuration information used for buffer status report to an IAB-node, the configuration information including at least one of the following:

a configured logical channel group identity, the number of configured logical channels (LCHs), a configured BH LCH ID, configuring whether an extended LCG range is adopted, and configuring whether a new buffer status report MAC CE format is adopted.

In another implementation, the apparatus for configuring buffer status report and the processor 2710 may be configured separately; for example, the apparatus for configuring buffer status report may be configured as a chip connected to the processor 2710, and the functions of the apparatus for configuring buffer status report are executed under control of the processor 2710.

Furthermore, as shown in FIG. 27, the network device 2700 may include transceiver 2740, and an antenna 2750, etc. Functions of the above components are similar to those in the related art, and shall not be described herein any further. It should be noted that the network device 2700 does not necessarily include all the parts shown in FIG. 27. Furthermore, the network device 2700 may include parts not shown in FIG. 27, and the related art may be referred to.

It can be seen from the above embodiment that by transmitting the configuration information for buffer status report to the IAB-node, the IAB-node may determine the format of the generated buffer status report MAC CE according to the configuration information and/or the capability of the IAB-MT. Thus, an effective BSR reporting mechanism may be provided for a case where a maximum number of logical channel groups exceeds 8.

Embodiment 12

The embodiment of this disclosure provides a communication system.

For example, the communication system includes a first network device, a second network device and a terminal equipment. The first network device is the network device according to Embodiment 10, and the second network device is the network device according to Embodiment 11.

Figure 28:
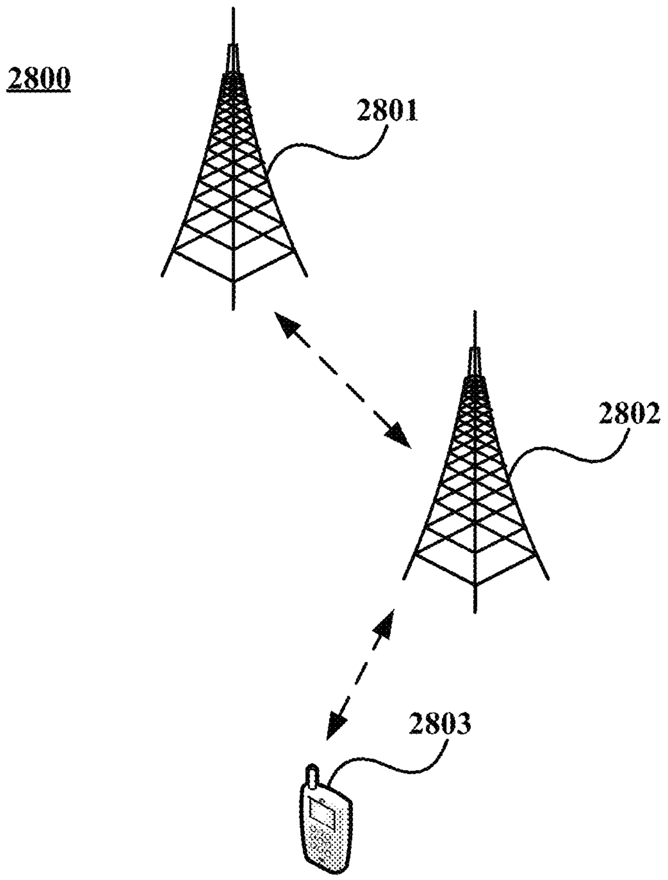
FIG. 28 is a schematic diagram of the communication system of Embodiment 12 of this disclosure.

FIG. 28 is a schematic diagram of the communication system of embodiment 12 of this disclosure. As shown in FIG. 28, a communication system 2800 includes a first network device 2801, a second network device 2802 and a terminal equipment 2803, the first network device 2801 being an IAB-node, the second network device 2802 being an IAB-donor, and the terminal equipment 2803 being a terminal equipment served by the IAB-node.

In addition, the first network device 2801, i.e. the IAB-node, may further include a descendant node, and the descendant node may also serve for the terminal equipment.

In addition, the first network device 2801, i.e. the IAB-node, may further include a parent node, and the first network device 2801 may exchange information with the IAB-donor via the parent node.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 22 may either correspond to software modules of procedures of a computer program, or correspond to hardware modules. Such software modules may respectively correspond to the steps shown in FIG. 5. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 22 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 22 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

According to the implementations disclosed in the embodiments, following supplements are further disclosed.

1. An apparatus for buffer status report, applicable to an IAB-node, the apparatus comprising:

a first generating unit configured to generate a buffer status report (BSR) MAC CE, the buffer status report MAC CE containing information on all logical channel groups having data to be transmitted and information on at least one buffer size, a maximum possible number of the logical channel groups being greater than 8; and a first transmitting unit configured to transmit the buffer status report MAC CE.

2. The apparatus according to supplement 1, wherein, when the number of padding bits is greater than or equal to a size of the buffer status report MAC CE plus a size of its subheader, the buffer status report MAC CE contains information on all logical channel groups having data to be transmitted and information on buffer sizes to which the logical channel groups correspond.

3. The apparatus according to supplement 2, wherein, the buffer status report is a truncated buffer status report (Truncated BSR), and when the number of padding bits is less than the size of the buffer status report MAC CE plus the size of its subheader, the buffer status report MAC CE contains information on logical channel groups not more than the number of padding bits and having data to be transmitted and information on a buffer size to which at least one logical channel group corresponds.

4. The apparatus according to any one of supplements 1-3, wherein, the buffer status report MAC CE comprises a first buffer status report MAC CE, the first buffer status report MAC CE indicating whether information on a buffer size to which a logical channel group corresponds is reported or whether a logical channel group has data to be transmitted via a bitmap.

5. The apparatus according to supplement 4, wherein, two logical channel identities (LCIDs) or an extended logical channel identity (eLCID) of one byte are/is used to identify whether the first buffer status report MAC CE is a buffer status report MAC CE or a truncated buffer status report MAC CE.

6. The apparatus according to any one of supplements 1-3, wherein, the buffer status report MAC CE comprises at least two second buffer status report MAC CEs, the at least two second buffer status report MAC CEs jointly containing information on all logical channel groups having data to be transmitted.

7. The apparatus according to supplement 6, wherein, a second buffer status report MAC CE is identified by a logical channel identity.

8. The apparatus according to supplement 6 or 7, wherein, different second buffer status report MAC CEs are identified by different logical channel identities.

9. An apparatus for buffer status report, applicable to an IAB-node, the apparatus comprising:

a second generating unit configured to generate a short buffer status report MAC CE when the number of logical channel group having data to be transmitted is not more than one, the buffer status report MAC CE containing information on a logical channel group and information on a buffer size, and a length of the short buffer status report MAC CE being 2 bytes; and a second transmitting unit configured to transmit the short buffer status report MAC CE.

10. The apparatus according to supplement 9, wherein, a length of the information on the logical channel group is 4 to 8 bits.

11. The apparatus according to supplement 9, wherein, the information on the logical channel group and a reserved bit constitute a byte.

12. The apparatus according to supplement 11, wherein, the information on the logical channel group is before or after the reserved bit.

13. The apparatus according to supplement 9, wherein, the information on the logical channel group is adjacent to the buffer size information.

14. The apparatus according to supplement 9, wherein, a length of a subheader of the short buffer status report MAC CE is one byte, and a length of an MAC sub-PDU containing the short buffer status report MAC CE is three bytes.

15. An apparatus for buffer status report, applicable to an IAB-node, the apparatus comprising:

a third generating unit configured to generate a short buffer status report (BSR) MAC CE when the number of logical channel groups having data to be transmitted is not more than N, the short buffer status report MAC CE containing information on N logical channel groups and information on at least one buffer size, N being an integer greater than or equal to 2; and a third transmitting unit configured to transmit the short buffer status report MAC CE.

16. The apparatus according to supplement 15, wherein, a length of the information on the logical channel group is 4 to 8 bytes.

17. The apparatus according to supplement 15 or 16, wherein, the information on the at least N logical channel groups is located in the same byte or different bytes.

18. The apparatus according to supplement 15, wherein, information on at least one logical channel group in the information on N logical channel groups is adjacent to information on a buffer size to which it corresponds, and/or information on at least two logical channel groups in the information on at least N logical channel groups is adjacent to each other, and/or information on at least two buffer sizes is adjacent to each other.

19. The apparatus according to supplement 15, wherein, N is 8, and information on 8 logical channel groups contained in the short buffer status report MAC CE constitutes a byte.

20. The apparatus according to any one of supplements 9-14, wherein the apparatus further comprises:

generating a long buffer status report MAC CE when the number of the logical channel groups having data to be transmitted exceeds 1.

21. The apparatus according to any one of supplements 15-19, wherein the apparatus further comprises:

generating a long buffer status report MAC CE when the number of the logical channel groups having data to be transmitted exceeds N.

22. The apparatus according to any one of supplements 9-21, wherein, the short buffer status report MAC CE comprises a short buffer status report MAC CE and a short truncated buffer status report MAC CE, and the long buffer status report MAC CE comprises a long buffer status report MAC CE and a long truncated buffer status report MAC CE.

23. The apparatus according to supplement 22, wherein, the short buffer status report MAC CE, the short truncated buffer status report MAC CE, the long buffer status report MAC CE and the long truncated buffer status report MAC CE are identified by 4 logical channel identities (LCIDs) or 4 expanded logical channel identities (eLCIDs) of one byte.

24. The apparatus according to any one of supplements 1-23, wherein the apparatus further comprises:

a determining unit configured to determine a format of a generated buffer status report MAC CE according to configuration information received from a donor CU and/or according to a capability of an IAB-MT.

25. The apparatus according to supplement 24, wherein, the buffer status report MAC CE is generated according to the apparatus as claimed in any one of supplements 1-23 when at least one of the following conditions is satisfied that:

a maximum value of a configured logical channel group identity is greater than a first threshold;

the number of configured logical channels (LCHs) is greater than or equal to a second threshold;

a configured BH LCH ID adopts an expanded LCH ID;

use of an expanded LCG ranged is configured;

use of a new format of a buffer status report MAC CE is configured; and the IAB-MT supports more than 8 LCGs.

26. The apparatus according to supplement 25, wherein, the configuration information is transmitted via RRC signaling.

27. An apparatus for configuring buffer status report, applicable to an IAB-donor, the apparatus comprising:

a transmitting unit configured to transmit configuration information used for buffer status report to an IAB-node, the configuration information including at least one of the following:

a configured logical channel group identity, the number of configured logical channels (LCHs), a configured BH LCH ID, configuring whether an extended LCG range is adopted, and configuring whether a new buffer status report MAC CE format is adopted.

28. The apparatus according to supplement 27, wherein, the configured BH LCH ID adopts an extended LCH ID, and/or, adopting an extended LCG range is configured, and/or, adopting a new buffer status report MAC CE format is configured.

29. The apparatus according to supplement 27 or 28, wherein, the configuration information is transmitted via RRC signaling.

30. A network device, comprising the apparatus as described in any one of supplements 1-29.

31. A communication system, comprising a first network device, a second network device and a terminal equipment, the first network device comprising the apparatus as described in any one of supplements 1-26, and the first network device comprising the apparatus as described in any one of supplements 27-29.

32. A method for buffer status report, applicable to an IAB-node, the method comprising:

generating a buffer status report MAC CE (BSR MAC CE), the buffer status report MAC CE containing information on all logical channel groups having data to be transmitted and information on at least one buffer size, a maximum possible number of the logical channel groups being greater than 8; and transmitting the buffer status report MAC CE.

33. The method according to supplement 32, wherein, when the number of padding bits is greater than or equal to a size of the buffer status report MAC CE plus a size of its subheader, the buffer status report MAC CE contains information on all logical channel groups having data to be transmitted and information on buffer sizes to which the logical channel groups correspond.

34. The method according to supplement 33, wherein, the buffer status report is a truncated buffer status report, and when the number of padding bits is less than the size of the buffer status report MAC CE plus the size of its subheader, the buffer status report MAC CE contains information on logical channel groups not more than the number of padding bits and having data to be transmitted and information on a buffer size to which at least one logical channel group corresponds.

35. The method according to any one of supplement 32-34, wherein, the buffer status report MAC CE comprises a first buffer status report MAC CE, the first buffer status report MAC CE indicating whether information on a buffer size to which a logical channel group corresponds is reported or whether a logical channel group has data to be transmitted via a bitmap.

36. The method according to supplement 35, wherein, two logical channel identities (LCIDs) or an extended logical channel identity (eLCID) of one byte are/is used to identify whether the first buffer status report MAC CE is a buffer status report MAC CE or a truncated buffer status report MAC CE.

37. The method according to any one of supplements 32-35, wherein, the buffer status report MAC CE comprises at least two second buffer status report MAC CEs, the at least two second buffer status report MAC CEs jointly containing information on all logical channel groups having data to be transmitted.

38. The method according to supplement 37, wherein, a second buffer status report MAC CE is identified by a logical channel identity.

39. The method according to supplement 37 or 38, wherein, different second buffer status report MAC CEs are identified by different logical channel identities.

40. A method for buffer status report, applicable to an IAB-node, the method comprising:

generating a short buffer status report MAC CE when the number of logical channel group having data to be transmitted is not more than one, the buffer status report MAC CE containing information on a logical channel group and information on a buffer size, and a length of the short buffer status report MAC CE being 2 bytes; and transmitting the short buffer status report MAC CE.

41. The method according to supplement 40, wherein, a length of the information on the logical channel group is 4 to 8 bits.

42. The method according to supplement 40, wherein, the information on the logical channel group and a reserved bit constitute a byte.

43. The method according to supplement 42, wherein, the information on the logical channel group is before or after the reserved bit.

44. The method according to supplement 40, wherein, the information on the logical channel group is adjacent to the buffer size information.

45. The method according to supplement 40, wherein, a length of a subheader of the short buffer status report MAC CE is one byte, and a length of an MAC sub-PDU containing the short buffer status report MAC CE is three bytes.

46. A method for buffer status report, applicable to an IAB-node, the method comprising:

generating a short buffer status report MAC CE (BSR MAC CE) when the number of logical channel groups having data to be transmitted is not more than N, the short buffer status report MAC CE containing information on N logical channel groups and information on at least one buffer size, N being an integer greater than or equal to 2; and transmitting the short buffer status report MAC CE.

47. The method according to supplement 46, wherein, a length of the information on the logical channel group is 4 to 8 bytes.

48. The method according to supplement 46 or 47, wherein, the information on the at least N logical channel groups is located in the same byte or different bytes.

49. The method according to supplement 46, wherein, information on at least one logical channel group in the information on N logical channel groups is adjacent to information on a buffer size to which it corresponds, and/or information on at least two logical channel groups in the information on at least N logical channel groups is adjacent to each other, and/or information on at least two buffer sizes is adjacent to each other.

50. The method according to supplement 46, wherein,

N is 8, and information on 8 logical channel groups contained in the short buffer status report MAC CE constitutes a byte.

51. The method according to any one of supplements 40-45, wherein the method further comprises:

generating a long buffer status report MAC CE when the number of the logical channel groups having data to be transmitted exceeds 1.

52. The method according to any one of supplements 46-50, wherein the method further comprises:

generating a long buffer status report MAC CE when the number of the logical channel groups having data to be transmitted exceeds N.

53. The method according to any one of supplements 40-52, wherein, the short buffer status report MAC CE comprises a short buffer status report MAC CE and a short truncated buffer status report MAC CE, and the long buffer status report MAC CE comprises a long buffer status report MAC CE and a long truncated buffer status report MAC CE.

54. The method according to supplement 53, wherein, the short buffer status report MAC CE, the short truncated buffer status report MAC CE, the long buffer status report MAC CE and the long truncated buffer status report MAC CE are identified by 4 logical channel identities (LCIDs) or 4 expanded logical channel identities (eLCIDs) of one byte.

55. The method according to any one of supplements 32-54, wherein the method further comprises:

determining a format of a generated buffer status report MAC CE according to configuration information received from a donor CU and/or according to a capability of an IAB-MT.

56. The method according to supplement 55, wherein, the buffer status report MAC CE is generated according to the method as claimed in any one of supplements 32-54 when at least one of the following conditions is satisfied that:

a maximum value of a configured logical channel group identity is greater than a first threshold;

the number of configured logical channels (LCHs) is greater than or equal to a second threshold;

a configured BH LCH ID adopts an expanded LCH ID;

use of an expanded LCG ranged is configured;

use of a new format of a buffer status report MAC CE is configured; and the IAB-MT supports more than 8 LCGs.

57. The method according to supplement 56, wherein, the configuration information is transmitted via RRC signaling.

58. A method for configuring buffer status report, applicable to an IAB-donor, the method comprising:

transmitting configuration information used for buffer status report to an IAB-node, the configuration information including at least one of the following:

a configured logical channel group identity, the number of configured logical channels (LCHs), a configured BH LCH ID, configuring whether an extended LCG range is adopted, and configuring whether a new buffer status report MAC CE format is adopted.

59. The method according to supplement 58, wherein, the configured BH LCH ID adopts an extended LCH ID, and/or, adopting an extended LCG range is configured, and/or, adopting a new buffer status report MAC CE format is configured.

60. The method according to supplement 58 or 59, wherein, the configuration information is transmitted via RRC signaling.

What is claimed is:

1. An apparatus for buffer status report, applicable to an integrated access and backhaul (IAB) node, the apparatus comprising:

processor circuitry configured to:

generate a buffer status report (BSR) media Access Control Control Element (MAC CE), the buffer status report MAC CE containing information on all logical channel groups (LCGs) having data to be transmitted and information on at least one buffer size, a maximum number of the logical channel groups being greater than 8;

determine a format of a generated buffer status report MAC CE according to configuration information received from a donor central unit (CU); and generate the buffer status report MAC CE when a maximum value of a configured logical channel group identifier in the configuration information is greater than a first threshold, and generate a legacy buffer status report MAC CE when a maximum value of a configured logical channel group identifier in the configuration information is smaller than or equal to the first threshold, and a transmitter configured to transmit the buffer status report MAC CE, wherein the buffer status report MAC CE comprises a first buffer status report MAC CE, and wherein an expanded logical channel identifier (eLCID) of one byte is used to identify whether the first buffer status report MAC CE is a buffer status report MAC CE or a truncated buffer status report MAC CE, and wherein a value of a codepoint of the eLCID ranges from 0 to 249, and a value of an index of the eLCID ranges from 64 to 313.

2. The apparatus according to claim 1, wherein, the maximum number of the logical channel groups is 256.

3. The apparatus according to claim 1, wherein, the first buffer status report MAC CE indicating whether information on a buffer size to which a logical channel group corresponds is reported or whether a logical channel group has data to be transmitted via a bitmap.

4. The apparatus according to claim 3, wherein, a length of the bitmap is 32 bytes.

5. The apparatus according to claim 3, wherein, the bitmap comprises 256 LCG fields, the LCG fields are sorted in ascending order according to indexes of the LCG fields.

6. The apparatus according to claim 1, wherein, the processor circuitry is configured to generate the buffer status report MAC CE for a pre-emptive BSR.

7. An apparatus for buffer status report, applicable to an integrated access and backhaul (IAB) node, the apparatus comprising:

processor circuitry configured to generate a short buffer status report media Access Control Control Element (MAC CE) when the number of logical channel group having data to be transmitted is not more than one, the short buffer status report MAC CE containing a LCG ID field and a Buffer Size field, and a length of the short buffer status report MAC CE being 2 bytes, wherein a length of the logical channel group identity (LCG ID) field is 1 byte, and a length of the Buffer Size field is 1 byte; and a transmitter configured to transmit the short buffer status report MAC CE, wherein an extended short buffer status report MAC CE, an extended short truncated buffer status report MAC CE, an extended long buffer status report MAC CE and an extended long truncated buffer status report MAC CE are identified by 4 expanded logical channel identifiers (eLCIDs), and wherein a value of a codepoint of the extended short buffer status report MAC CE, the extended short truncated buffer status report MAC CE, the extended long buffer status report MAC CE or the extended long truncated buffer status report MAC CE is any of 0 to 249.

8. The apparatus according to claim 7, wherein, a length of the LCG ID field is 8 bits.

* * * * *